(12) United States Patent     (10) Patent No.:   US 12,597,048 B2

Rifai et al.     (45) Date of Patent:    Apr. 7, 2026

(54) LOYALTY REWARDS EXCHANGE SYSTEMS AND METHODS

(71) Applicant: Cosmopoints Loyalty Tech Ltd, Dubai (AE)

(72) Inventors: Rawad Rifai, Dubai (AE); Rayan Antonios, Dubai (AE); William Awad, Chicago, IL (US)

(73) Assignee: Cosmopoints Loyalty Tech Ltd, Dubai (AE)

( * ) Notice: Subject to any disclaimer, the term of this patent is extended or adjusted under 35 U.S.C. 154(b) by 0 days.

(21) Appl. No.: 18/655,521

(22) Filed: May 6, 2024

(65) Prior Publication Data

US 2025/0342497 A1     Nov. 6, 2025

(51) Int. Cl.
    *G06Q 30/00*       (2023.01)
    *G06Q 30/0207*    (2023.01)
    *G06Q 30/0226*    (2023.01)

(52) U.S. Cl.
    CPC ..... *G06Q 30/0227* (2013.01); *G06Q 30/0215* (2013.01)

(58) Field of Classification Search
    None
    See application file for complete search history.

(56) References Cited

U.S. PATENT DOCUMENTS

| | | | |
|---|---|---|---|
| 7,424,617 B2 * | 9/2008 | Boyd | G06Q 30/0226 463/16 |
| 8,407,087 B2 * | 3/2013 | Postrel | G06Q 30/0233 235/380 |

(Continued)

FOREIGN PATENT DOCUMENTS

| | | | |
|---|---|---|---|
| CA | 2550067 A1 * | 12/2007 | ............. G06Q 30/02 |
| KR | 20170081113 A | 7/2017 | |

(Continued)

OTHER PUBLICATIONS

Jalbert, Terrance, Jonathan D. Stewart, and Drew Martin. "The value of credit card benefits." Financial Services Review 19.3 (2010): 227. (Year: 2010).*

(Continued)

*Primary Examiner* — Michael Bekerman

(74) *Attorney, Agent, or Firm* — Edlavitch Law PLLC

(57) ABSTRACT

In some examples, a method is included for converting and exchanging loyalty points. The method includes generating, by a computing system, records that include relationship information linking a credit card of a credit card issuer to loyalty rewards program entities. The method includes converting card issuer points of the issuer to loyalty rewards program points of one loyalty rewards program entity of the program entities according to a point conversion rule. The loyalty rewards program points can be issued by the one loyalty rewards program entity to a corresponding loyalty rewards program account of a cardholder of the card after the conversion and according to the point conversion rule. And, the conversion of the card issuer points to the loyalty rewards program points can include a two-step conversion including converting the card issuer points to intermediate points and then converting the intermediate points to the loyalty rewards program points.

20 Claims, 15 Drawing Sheets

Multi-Branded Card Operations    130

(56) References Cited

U.S. PATENT DOCUMENTS

| | | | | |
|---|---|---|---|---|
| 8,540,152 | B1* | 9/2013 | Buchheit | G06Q 20/381 |
| | | | | 235/487 |
| 9,251,528 | B1 | 2/2016 | Mcghie et al. | |
| 10,839,446 | B1* | 11/2020 | Mupkala | G06Q 30/0633 |
| 11,030,681 | B2 | 6/2021 | Bathen et al. | |
| 11,449,887 | B2 | 9/2022 | Durvasula et al. | |
| 11,699,166 | B2 | 7/2023 | Chan et al. | |
| 11,790,350 | B2 | 10/2023 | Ortiz et al. | |
| 2003/0236704 | A1* | 12/2003 | Antonucci | G06Q 30/0283 |
| | | | | 705/14.3 |
| 2004/0122736 | A1* | 6/2004 | Strock | G06Q 30/0207 |
| | | | | 705/14.31 |
| 2006/0036484 | A1* | 2/2006 | Voticky | G06Q 30/0231 |
| | | | | 705/14.31 |
| 2006/0053056 | A1* | 3/2006 | Alspach-Goss | G06Q 20/10 |
| | | | | 705/14.27 |
| 2006/0271432 | A1* | 11/2006 | Sickel | G06Q 30/02 |
| | | | | 705/14.33 |
| 2009/0094118 | A1* | 4/2009 | Antonucci | G06Q 30/0211 |
| | | | | 705/26.1 |
| 2010/0042517 | A1* | 2/2010 | Paintin | G06Q 30/02 |
| | | | | 705/30 |
| 2012/0047008 | A1* | 2/2012 | Alhadeff | G06Q 30/0215 |
| | | | | 705/14.16 |
| 2012/0059701 | A1 | 3/2012 | Van der Veen et al. | |
| 2012/0278156 | A1* | 11/2012 | Kannan | G06Q 30/0207 |
| | | | | 705/14.32 |
| 2014/0365287 | A1* | 12/2014 | Pedersoli | G06Q 30/0226 |
| | | | | 705/14.25 |
| 2014/0365293 | A1 | 12/2014 | Postrel | |
| 2015/0161642 | A1* | 6/2015 | Pastore | G06Q 30/0224 |
| | | | | 705/14.25 |
| 2019/0156362 | A1* | 5/2019 | Ezagui | H04W 4/029 |
| 2021/0150549 | A1 | 5/2021 | Tietzen | |
| 2021/0295297 | A1 | 9/2021 | Salmon et al. | |
| 2023/0005009 | A1* | 1/2023 | Tietzen | G06Q 30/0215 |
| 2023/0005011 | A1* | 1/2023 | Hennessy | G06Q 30/0229 |
| 2023/0117672 | A1* | 4/2023 | Kruszewski | G06Q 30/0226 |
| | | | | 705/14.29 |

FOREIGN PATENT DOCUMENTS

| | | | | |
|---|---|---|---|---|
| KR | 102493513 | B1 | 1/2023 | |
| WO | WO-2006078750 | A2* | 7/2006 | G06Q 30/0241 |

OTHER PUBLICATIONS

International Search Report for International Application No. PCT/US2025/025904.

Written Opinion of the International Search Authority for International Application No. PCT/US2025/025904.

* cited by examiner

Co-Branded Card Operations (Prior Art)  100

Multi-Branded Card Operations  130

Points Exchange, Pricing                    150

Automatic Points Exchange                    170

500

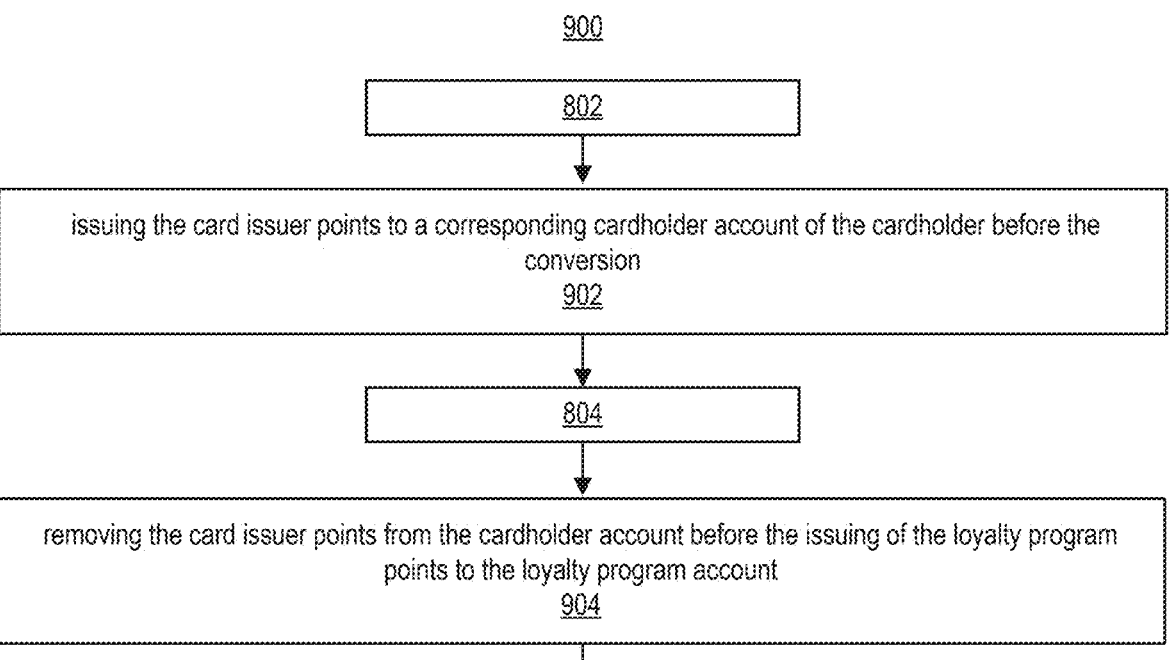

800 generating records that comprise relationship information linking a credit card of a credit card issuer to a plurality of loyalty program entities
802 converting card issuer points of the credit card issuer to loyalty program points of one loyalty program entity of the plurality of loyalty program entities according to a predetermined point conversion rule
804 issuing the loyalty program points to a corresponding loyalty program account of a cardholder of the credit card after the conversion and automatically according to the point conversion rule
806

802 issuing the card issuer points to a corresponding cardholder account of the cardholder before the conversion
902

804 removing the card issuer points from the cardholder account before the issuing of the loyalty program points to the loyalty program account
904

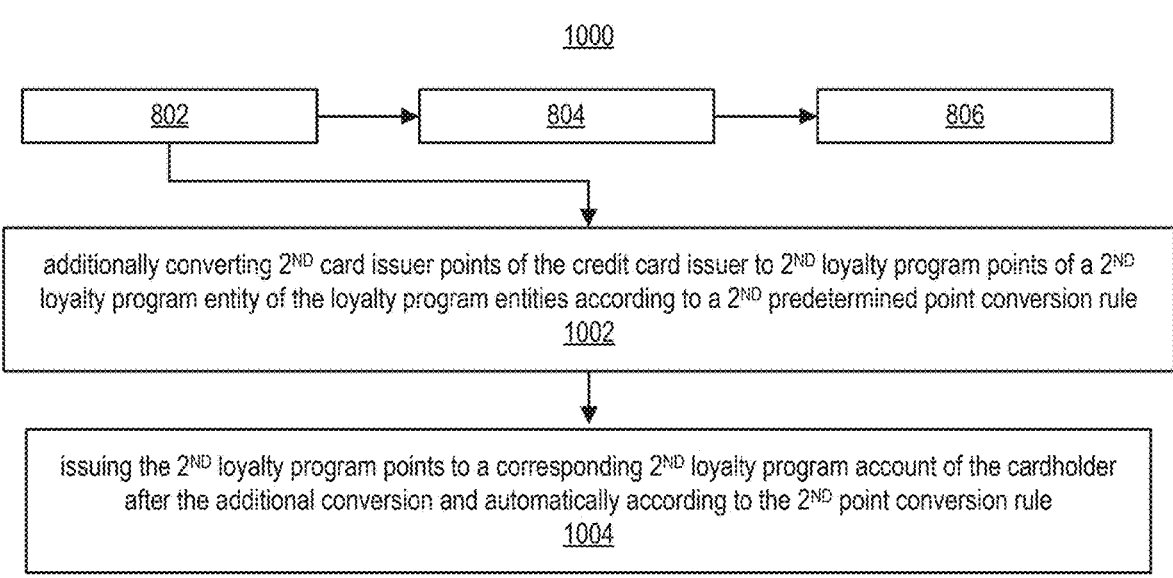

additionally converting 2ND card issuer points of the credit card issuer to 2ND loyalty program points of a 2ND loyalty program entity of the loyalty program entities according to a 2ND predetermined point conversion rule
1002 issuing the 2ND loyalty program points to a corresponding 2ND loyalty program account of the cardholder after the additional conversion and automatically according to the 2ND point conversion rule
1004

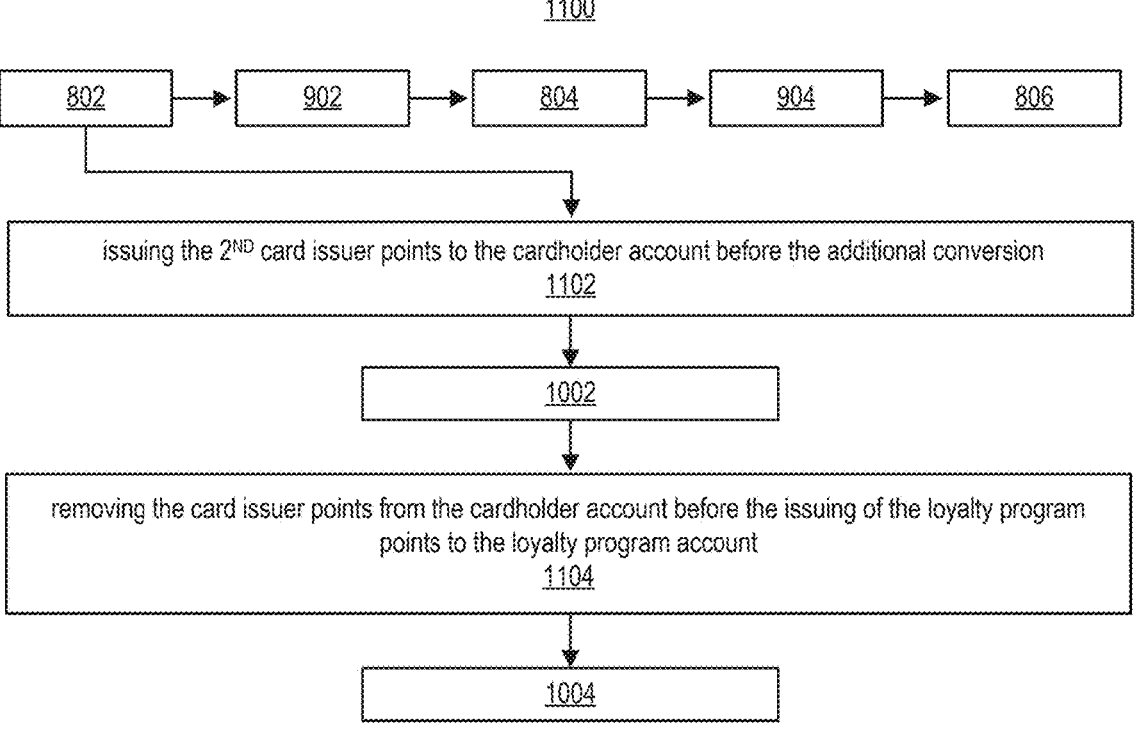

issuing the 2ND card issuer points to the cardholder account before the additional conversion
1102

1002 removing the card issuer points from the cardholder account before the issuing of the loyalty program points to the loyalty program account
1104

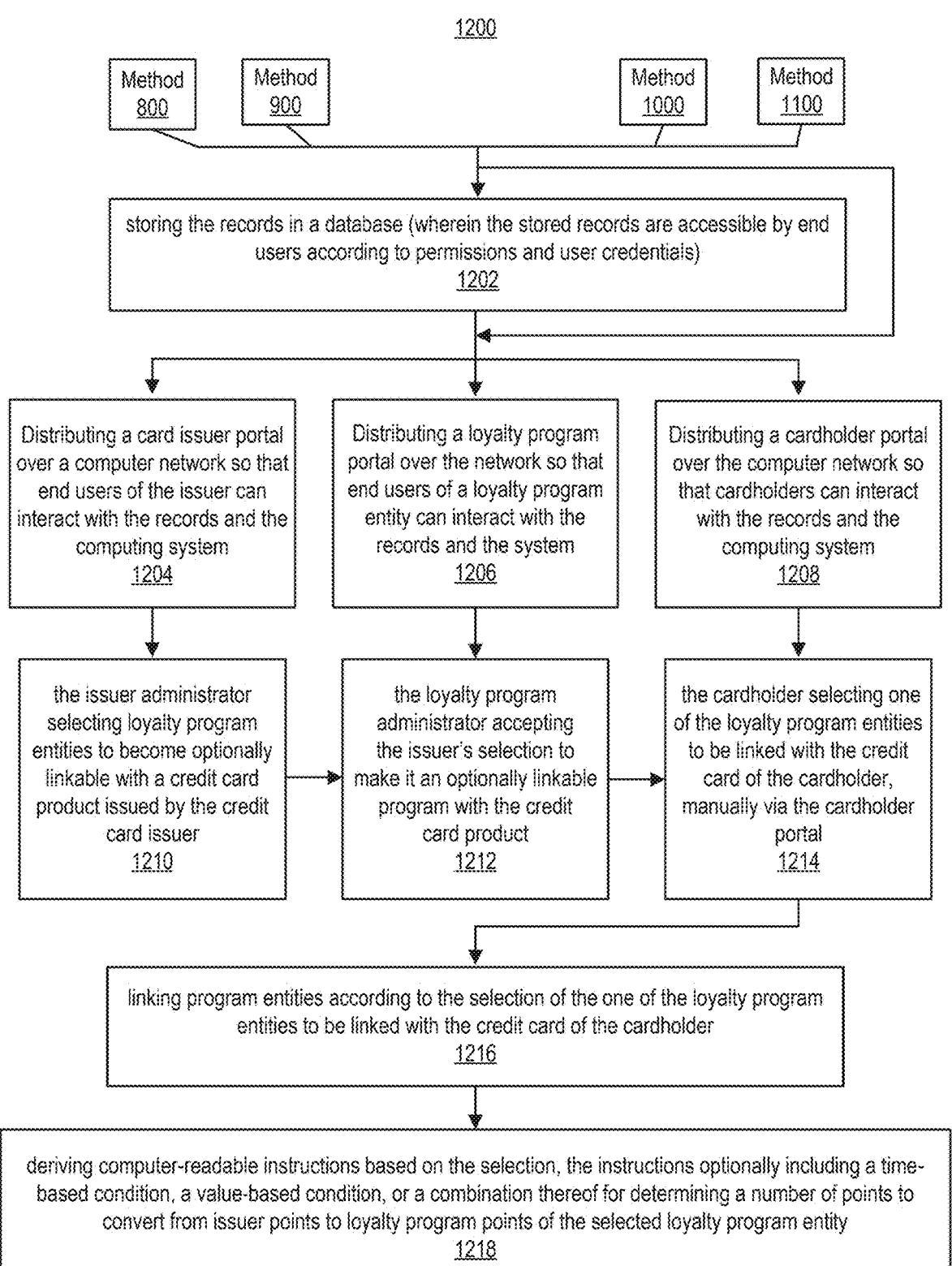

1200

Method 800

Method 900

Method 1000

Method 1100 storing the records in a database (wherein the stored records are accessible by end users according to permissions and user credentials)
1202

Distributing a card issuer portal over a computer network so that end users of the issuer can interact with the records and the computing system
1204

Distributing a loyalty program portal over the network so that end users of a loyalty program entity can interact with the records and the system
1206

Distributing a cardholder portal over the computer network so that cardholders can interact with the records and the computing system
1208 the issuer administrator selecting loyalty program entities to become optionally linkable with a credit card product issued by the credit card issuer
1210 the loyalty program administrator accepting the issuer's selection to make it an optionally linkable program with the credit card product
1212 the cardholder selecting one of the loyalty program entities to be linked with the credit card of the cardholder, manually via the cardholder portal
1214 linking program entities according to the selection of the one of the loyalty program entities to be linked with the credit card of the cardholder
1216 deriving computer-readable instructions based on the selection, the instructions optionally including a time-based condition, a value-based condition, or a combination thereof for determining a number of points to convert from issuer points to loyalty program points of the selected loyalty program entity
1218

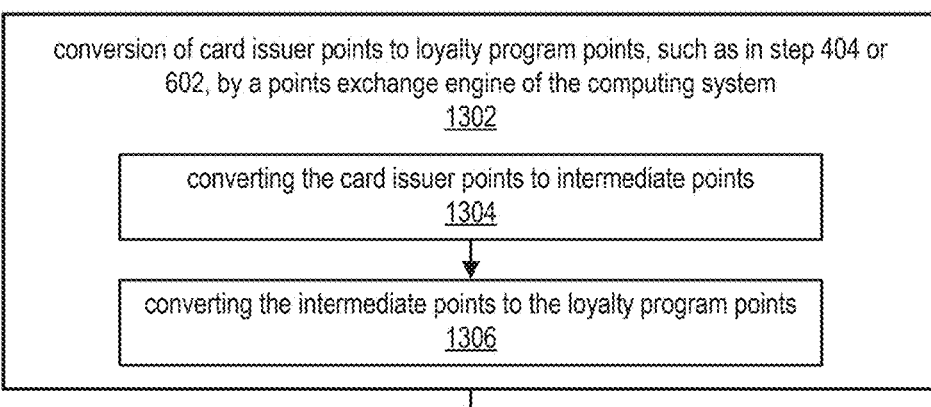

conversion of card issuer points to loyalty program points, such as in step 404 or 602, by a points exchange engine of the computing system
1302 converting the card issuer points to intermediate points
1304 converting the intermediate points to the loyalty program points
1306 movement of the points from one entity to the other for use by the cardholder occurs after the conversion
1308

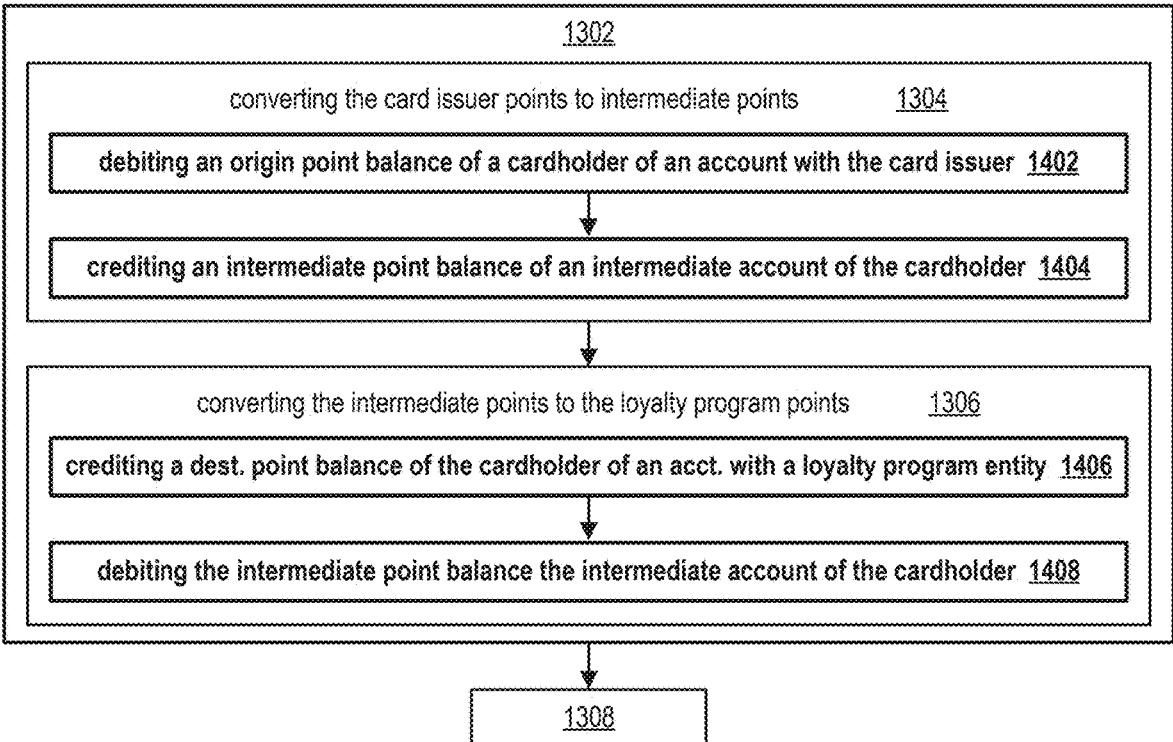

1302 converting the card issuer points to intermediate points          1304 debiting an origin point balance of a cardholder of an account with the card issuer  1402 crediting an intermediate point balance of an intermediate account of the cardholder  1404 converting the intermediate points to the loyalty program points          1306 crediting a dest. point balance of the cardholder of an acct. with a loyalty program entity  1406 debiting the intermediate point balance the intermediate account of the cardholder  1408

Integration with the Platform  1500

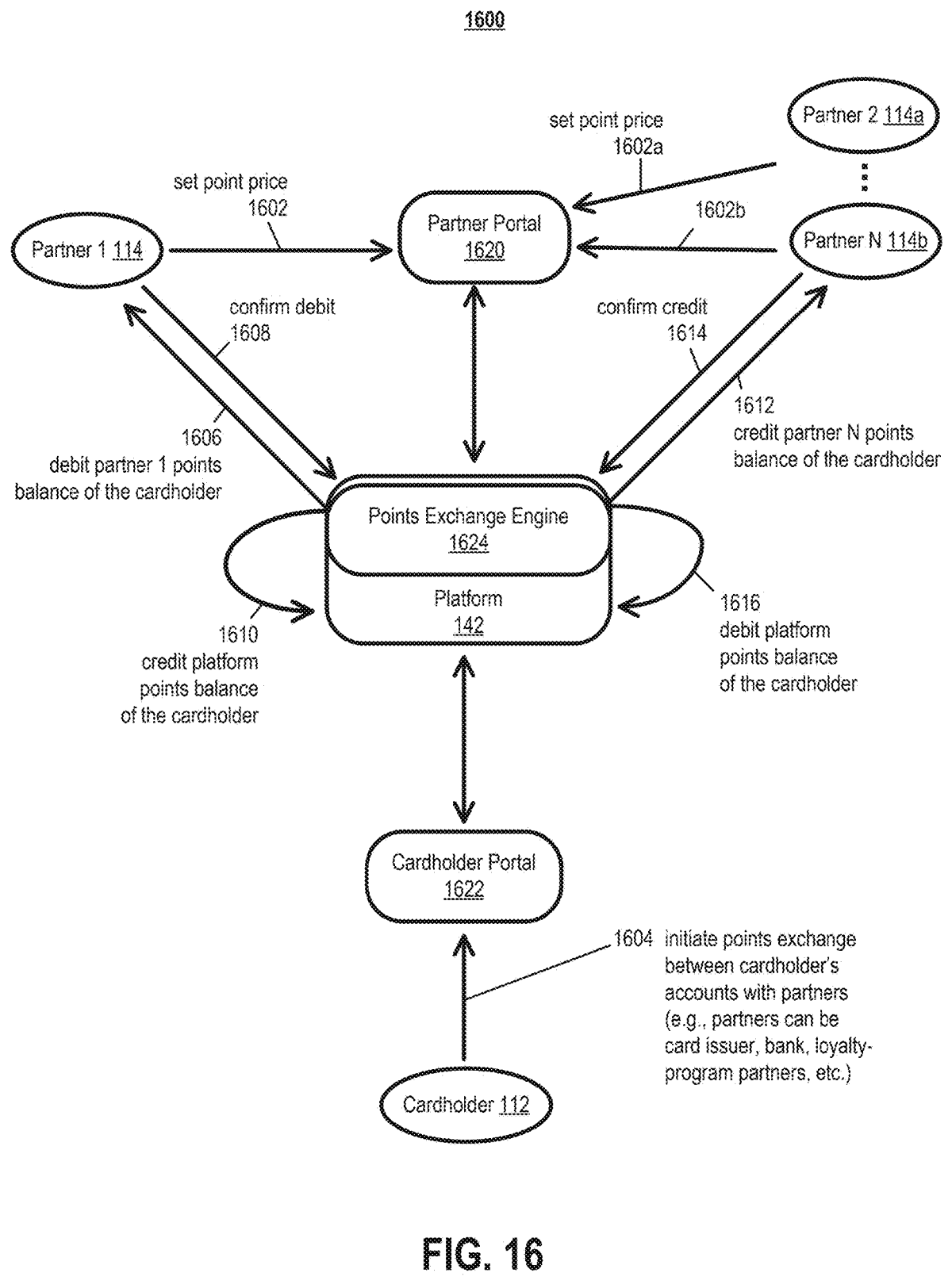

1600 set point price
1602a

Partner 2 114a set point price
1602

Partner 1 114 → Partner Portal 1620 ← 1602b ← Partner N 114b confirm debit
1608 confirm credit
1614

1606
debit partner 1 points
balance of the cardholder 1612
credit partner N points
balance of the cardholder Points Exchange Engine
1624

Platform
142

1610
credit platform
points balance
of the cardholder 1616
debit platform
points balance
of the cardholder Cardholder Portal
1622

1604  initiate points exchange
between cardholder's
accounts with partners
(e.g., partners can be
card issuer, bank, loyalty-
program partners, etc.)

Cardholder 112

FIG. 16

Identity Management Database Table
1700

| Universal User ID | Partner User ID | Partner ID |
|---|---|---|
| 1 | 777 | A |
| 1 | 888 | B |
| 2 | 999 | B |

Database User Mapping
1800

Exchange Percentage-Based-Trigger Database Table
1900

| Universal User ID | Bank ID | Partner ID | Percentage |
|---|---|---|---|
| 1 | A | 123 | 50% |
| 1 | A | 456 | 50% |
| 2 | A | 123 | 100% |

FIG. 19

Exchange Time-Based-Trigger Database Table
2000

| Universal User ID | Bank ID | Partner ID | After |
|---|---|---|---|
| 1 | A | 123 | Jan 2024 |
| 1 | A | 456 | June 2024 |
| 2 | A | 123 | Feb 2024 |

FIG. 20

Exchange Value-Based-Trigger Database Table
2100

| Universal User ID | Bank ID | Partner ID | Value Greater Than |
|---|---|---|---|
| 1 | A | 123 | $50 |
| 1 | A | 456 | $100 |
| 2 | A | 123 | $75 |

FIG. 21

Multi-Branded Card Operations
(e.g, without a Bank Partner)                    2200

Points Exchange, Pricing
(e.g, without a Bank Partner)                    2300

Automatic Points Exchange
(e.g, without a Bank Partner)      2400

LOYALTY REWARDS EXCHANGE SYSTEMS AND METHODS

TECHNICAL FIELD

The present disclosure relates to computing systems for exchanging loyalty rewards and methods thereof.

BACKGROUND

Loyalty rewards, such as loyalty points, also known as reward points or loyalty rewards, are a form of currency or credit given to customers by businesses as a way to incentivize repeat actions, such as repeat purchases, or continued engagement with their products or services. Customers or other types of end users (e.g., cardholders) typically earn loyalty rewards based on their spending or participation in certain activities, such as making purchases, referring friends, participating in promotions, completing surveys, or engaging with businesses on social media.

These rewards or points can then be accumulated over time and redeemed for various other rewards, such as discounts on future purchases, free products or services, exclusive access to events or promotions, or even cash back. Loyalty points or rewards programs are a common strategy used by businesses across various industries to incentivize customer loyalty, increase retention rates, and encourage repeat business. Loyalty points or rewards programs are common in industries such as retail, hospitality, travel, and finance, and they serve as a way for businesses to foster customer loyalty and encourage ongoing patronage.

Credit card points are a type of loyalty points, often referred to as reward points or credit card rewards, and are a form of incentive offered by credit card companies or banks to their cardholders. When cardholders make purchases using their credit cards, they earn a certain number of points based on the amount spent and any bonus categories specified by the credit card issuer. Similarly, these points can then be redeemed for various rewards, such as travel rewards (such as airline tickets, hotel stays, or car rentals), cash back, merchandise, gift cards, statement credits, or experiences. The value of credit card points can vary depending on the specific rewards program, the redemption options available, and how the points are used.

Credit card points programs are a popular feature offered by many credit card issuers as a way to attract customers, encourage spending, and promote loyalty to their brand. Cardholders often choose credit cards with rewards programs that align with their spending habits and lifestyle preferences to maximize the benefits they can receive.

Loyalty points exchange systems facilitate conversions of loyalty points from one program into rewards or points in another loyalty rewards program. This exchange can occur between loyalty rewards programs operated by the same company or between different companies that have established partnerships or agreements. For example, a customer may have loyalty points with an airline, and that customer may be able to exchange those points for hotel rewards through a partnership between the airline and a hotel chain. Similarly, some credit card issuers allow cardholders to transfer their credit card points to partner loyalty rewards programs, such as airlines or hotel chains.

Loyalty point exchange can offer customers more flexibility and value by allowing them to combine or leverage their points across multiple programs to access a wider range of rewards or benefits. It can also be a strategic way for businesses to attract new customers or enhance the value proposition of their loyalty rewards programs.

Although many technologies have evolved to improve loyalty points exchange systems or other types of rewards systems, there is still much to be improved upon and many technical problems to be solved, such as making loyalty points exchange systems or other types of rewards systems more flexible for end users, customers, and cardholders.

SUMMARY

Disclosed herein are technologies (including computing systems and methods thereof) for improving upon exchanging loyalty rewards (such as loyalty points) and customer engagement with such exchanges. Specifically, in some examples, a method is included for changing, converting, or exchanging loyalty rewards. The method includes generating, by a computing system, records that include relationship information linking a vehicle for earning rewards or a rewards-earning vehicle (e.g., a credit card) of an issuer entity (e.g., a credit card issuer) to loyalty rewards program entities (e.g., the issuer, other issuers, banks, and other types of organizations with loyalty rewards programs). The method also includes changing, exchanging, or converting, such as by a points exchange engine or another type of engine of the computing system, first partner points (e.g., card issuer points of the credit card issuer) to second partner points (e.g., loyalty rewards program points of one loyalty rewards program entity of the plurality of loyalty rewards program entities) according to a conversion rule such as a points conversion rule (which can be dynamic, static, or predetermined). In some cases, the loyalty rewards program points are issued by the one loyalty rewards program entity to a corresponding loyalty rewards program account of a cardholder of a credit card after the conversion and automatically according to a point conversion rule. And, in some cases, the conversion of the card issuer points to the loyalty rewards program points includes a two-step conversion including converting the card issuer points to intermediate points and then converting the intermediate points to the loyalty rewards program points.

With respect to the aforementioned features and operations as well as the other disclosed operations and features of embodiments described herein, such features and operations can be applicable to any type of loyalty rewards program of the same organization or different organizations. And, although many of the embodiments described herein use or refer to a credit card, a credit card issuer, and a cardholder, it is to be understood that such embodiments with minor adjustments can implement systems for any type of vehicle for a customer or end user to earn points or rewards of any type besides points when performing certain activities such as spending money via the vehicle. Thus, it is to be understood that a credit card could be replaced in some embodiments with such a rewards-earning vehicle and that a credit card is a specific implementation of such a vehicle. Also, generally speaking, the vehicle can be issued by a rewards vehicle issuer. Specifically, the vehicle issuer can be a credit card issuer wherein the vehicle is, includes, or is associated with a credit card. And, generally speaking, an end user or customer can be the earner of such rewards via the use of the vehicle. Specifically, the end user or customer can be a credit card user or cardholder wherein the vehicle is, includes, or is associated with a credit card. Also, it is to be understood that the rewards-earning vehicle in some embodiments is issued by the issuer for an end user's or a customer's account with a bank or another type of financial organization, and such embodiments can be altered to be applicable to the rewards-earning vehicle being issued for an end user's or a customer's account with another type of organization besides a bank or another type of financial organization. Also, throughout this specification, many embodiments use or refer to the use of a credit card, and it is to be understood that such embodiments can be changed to be applicable with the use of debit cards.

The computing systems and technologies disclosed herein can also provide specific technical solutions to at least overcome the technical problems mentioned in the background section and other parts of the application as well as other technical problems not described herein but recognized by those skilled in the art, such as technical solutions to overcome technical problems in the exchanging of loyalty rewards (e.g., loyalty points) and customer engagement with such exchanges.

With respect to some embodiments, disclosed herein are computerized methods for converting and exchanging loyalty rewards (such as loyalty points), as well as a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for converting and exchanging loyalty rewards (such as loyalty points).

With respect to some embodiments, a system is provided that includes at least one computing device configured to generate and use loyalty rewards conversion and exchange processes. And, with respect to some embodiments, a corresponding method is provided to be performed by at least one computing device. In some example embodiments, computer program code can be executed by at least one processor of one or more computing devices to implement functionality in accordance with at least some embodiments disclosed herein; and the computer program code being at least a part of or stored in a non-transitory computer-readable medium.

For example, some embodiments can include a method (such as method 800 shown in FIG. 8), implemented by a computing system (such as computing system 600 shown in FIG. 6), for converting and exchanging loyalty points as well as enhancing user engagement with such exchanges (e.g., see method 1200 shown in FIG. 12). In some examples, the method can be combined with any one or more of the methods disclosed herein. The method can start with generating, by a computing system (such as the computing system 600), records that include relationship information linking a credit card of a credit card issuer to a plurality of loyalty rewards program entities (e.g., see step 802 of method 800). The method can continue with converting, such as by a points exchange engine of the computing system, card issuer points of the credit card issuer to loyalty rewards program points of one loyalty rewards program entity of the plurality of loyalty rewards program entities according to a predetermined point conversion rule (e.g., see step 804 of method 800). In some embodiments, the loyalty rewards program points are issued by the one loyalty rewards program entity to a corresponding loyalty rewards program account of a cardholder of the credit card after the conversion and automatically according to the point conversion rule. In some examples, the card issuer points are issued by the credit card issuer to a corresponding cardholder account of the cardholder before the conversion, and the issuing of the loyalty rewards program points to the loyalty rewards program account follows removing the card issuer points from the cardholder account (e.g., see method 900 shown in FIG. 9).

In some examples, the card issuer points are first card issuer points, the loyalty rewards program points are first loyalty rewards program points, and the predetermined point conversion rule is a first predetermined point conversion rule. And, the method further includes additionally converting, by the computing system, second card issuer points of the credit card issuer to second loyalty rewards program points of a second loyalty rewards program entity of the plurality of loyalty rewards program entities according to a second predetermined point conversion rule (e.g., see method 1000 depicted in FIG. 10). In such cases, the second loyalty rewards program points are issued by the second loyalty rewards program entity to a corresponding second loyalty rewards program account of the cardholder after the additional conversion and automatically according to the second point conversion rule. In some embodiments, such as shown in method 1100 of FIG. 11, the second card issuer points are issued by the credit card issuer to the cardholder account before the additional conversion, and the issuing of the second loyalty rewards program points to the second loyalty rewards program account follows removing the second card issuer points from the cardholder account.

In some cases, the conversions of the first and second card issuer points to the first and second loyalty rewards program points occur in response to the first and second card issuer points issuing to the cardholder account after respective selected amount of times or on respective selected days of a week, a month, or a billing cycle after the issuance of the issuer points to the cardholder account. Also, in some embodiments, the respective selected amount of times are each the same amount of time or the respective selected days are each the same day. Or, the respective selected amount of times can each be a different amount of time or the respective selected days can each be a different day.

In some embodiments, the method further includes storing, by the computing system, the records in a database (e.g., see step 1202 of method 1200). The stored records can then be accessible by end users of the computing system according to permissions and user credentials of the end users. The end users can include any one or more of the cardholders and the administrators of the credit card issuer, the loyalty rewards program entities, and the computing system.

In some embodiments, the method further includes distributing, by the computing system, an issuer portal over a computer network (e.g., see step 1204) and a portal for a loyalty rewards program administrator (e.g., see step 1206). The issuer portal can be configured to facilitate issuer administrator interactions with the computing system, and the issuer administrator interactions can include the issuer administrator selecting loyalty rewards program entities to become linkable with a credit card product issued by the credit card issuer. Also, the method can further include distributing, by the computing system, a cardholder portal over the computer network (e.g., see step 1208). The cardholder portal can be configured to facilitate cardholder interactions with the computing system, and the cardholder interactions can include the cardholder selecting one of the loyalty rewards program entities to be linked with the credit card of the cardholder. The method can also include linking program entities according to the selection of the one of the loyalty rewards program entities to be linked with the credit card of the cardholder (e.g., see step 1216). In some examples, corresponding computer-readable instructions are derived by the computing system based on the selection. Also, the selection can be made manually by the cardholder via the cardholder portal (e.g., see step 1218). In some embodiments, the computer-recorded instructions include a time-based condition, a value-based condition, or a combination thereof for determining a number of points to convert from issuer points to loyalty rewards program points of the selected loyalty rewards program entity.

In some embodiments, the point conversion rule includes an exchange rate. The point conversion rule can include an issuer's price for a point issued by the credit card issuer and a loyalty rewards program entity's price for a point issued by the loyalty rewards program entity. Also, the issuer's and loyalty rewards program entity's prices can be a basis for determining the exchange rate.

Also, the conversion of the card issuer points to the loyalty rewards program points can include a two-step conversion including converting the card issuer points to intermediate points and then converting the intermediate points to the loyalty rewards program points (e.g., see method 1300 shown in FIG. 13). In some cases, each conversion of the two-step conversion is a separate atomic transaction. And, movement of the points from one entity to another entity can occur after the two-step conversion. Furthermore, the movement of the points from one entity to the other entity can be an atomic transaction separate from other transfers of points. In some examples, the method further includes initializing, by the engine, two atomic transactions of the two-step conversion separately before moving the points from one entity to the other entity.

In some embodiments, such as shown in method 1400 of FIG. 14, the first atomic transaction of the two atomic transactions can include debiting an origin point balance of a cardholder of an account with the card issuer and crediting an intermediate point balance of the cardholder of an intermediate account of the cardholder, wherein the intermediate account is hosted by the computing system. And, the second atomic transaction of the two atomic transactions can include crediting a destination point balance of the cardholder of an account with a loyalty rewards program entity and debiting the intermediate point balance of the cardholder associated with the intermediate account of the cardholder.

These and other important aspects of the invention are described more fully in the detailed description below. The invention is not limited to the particular assemblies, apparatuses, methods, and systems disclosed herein. Other embodiments can be used and changes to the described embodiments can be made without departing from the scope of the claims that follow the detailed description.

BRIEF DESCRIPTION OF THE DRAWINGS

The present disclosure will be understood more fully from the detailed description given below and from the accompanying drawings of various example embodiments of the disclosure.

FIGS. 8 to 14 illustrate example methods of the technologies disclosed herein, in accordance with some embodiments of the present disclosure.

FIG. 16 illustrates a schematic flowchart of various parts of a software-based platform interacting with a points exchange engine of the platform, in accordance with some embodiments of the present disclosure.

FIGS. 19 to 21 illustrate database tables for the automatic exchange trigger rules feature of the platform, in accordance with some embodiments of the present disclosure.

DETAILED DESCRIPTION

Figure 1:
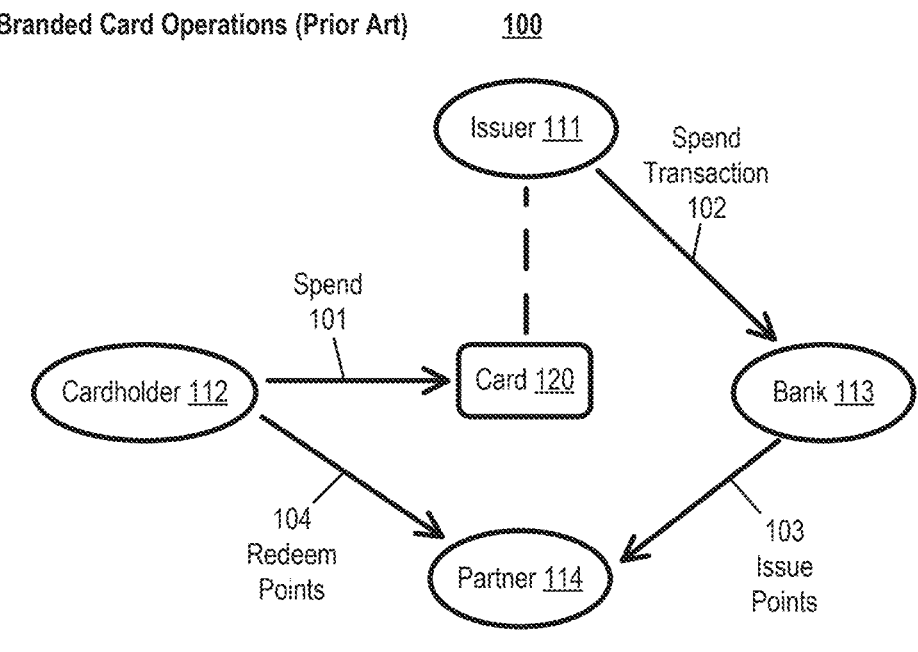
FIG. 1 illustrates a schematic flowchart for co-branded card operations, which are known prior art.

The present disclosure will be understood more fully from the detailed description given below and from the accompanying drawings of various example embodiments of the disclosure.

Disclosed herein are technologies (including computing systems and methods thereof) for improving upon exchanging loyalty rewards (such as loyalty points) and customer engagement with such exchanges. Specifically, in some examples, a method is included for changing, converting, or exchanging loyalty rewards. The method includes generating, by a computing system, records that include relationship information linking a vehicle for earning rewards (e.g., a credit card) of an issuer entity (e.g., a credit card issuer) to loyalty rewards program entities (e.g., the issuer, other issuers, banks, and other types of organizations with loyalty rewards programs). The method also includes changing, exchanging, or converting, such as by a points exchange engine or another type of engine of the computing system, first partner points (e.g., card issuer points of the credit card issuer) to second partner points (e.g., loyalty rewards program points of one loyalty rewards program entity of the plurality of loyalty rewards program entities) according to a conversion rule such as a points conversion rule (which can be dynamic, static, or predetermined). In some cases, the loyalty rewards program points are issued by the one loyalty rewards program entity to a corresponding loyalty rewards program account of a cardholder of a credit card after the conversion and automatically according to a point conversion rule. And, in some cases, the conversion of the card issuer points to the loyalty rewards program points includes a two-step conversion including converting the card issuer points to intermediate points and then converting the intermediate points to the loyalty rewards program points.

For example, disclosed herein are technologies (including computing systems and methods thereof) for improving upon exchanging loyalty points and customer engagement with such exchanges. Specifically, in some examples, a method is included for converting and exchanging loyalty points. The method includes generating, by a computing system, records that include relationship information linking a credit card of a credit card issuer to loyalty rewards program entities. The method also includes converting, such as by a points exchange engine of the computing system, card issuer points of the credit card issuer to loyalty rewards program points of one loyalty rewards program entity of the plurality of loyalty rewards program entities according to a point conversion rule (which can be dynamic, static, or predetermined). In some examples, the point conversion rule includes an exchange rate. In some cases, the loyalty rewards program points are issued by the one loyalty rewards program entity to a corresponding loyalty rewards program account of a cardholder of the credit card after the conversion and automatically according to the point conversion rule. And, in some cases, the conversion of the card issuer points to the loyalty rewards program points includes a two-step conversion including converting the card issuer points to intermediate points and then converting the intermediate points to the loyalty rewards program points.

The computing systems and technologies disclosed herein can also provide specific technical solutions to at least overcome the technical problems mentioned in the background section and other parts of the application as well as other technical problems not described herein but recognized by those skilled in the art, such as technical solutions to overcome technical problems in the exchanging of loyalty rewards (such a loyalty points) and customer engagement with such exchanges.

With respect to the aforementioned features and operations as well as the other disclosed operations and features of embodiments described herein, such features and operations can be applicable to any type of loyalty rewards program of the same organization or different organizations. And, although many of the embodiments described herein use or refer to a credit card, a credit card issuer, and a cardholder, it is to be understood that such embodiments with minor adjustments can implement systems for any type of vehicle for a customer or end user to earn points or rewards of any type besides points when performing certain activities such as spending money via the vehicle. Thus, it is to be understood that a credit card could be replaced in some embodiments with such a rewards-earning vehicle and that a credit card is a specific implementation of such a vehicle. Also, generally speaking, the vehicle can be issued by a rewards vehicle issuer. Specifically, the vehicle issuer can be a credit card issuer wherein the vehicle is, includes, or is associated with a credit card. And, generally speaking, an end user or customer can be the earner of such rewards via the use of the vehicle. Specifically, the end user or customer can be a credit card user or cardholder wherein the vehicle is, includes, or is associated with a credit card. Also, it is to be understood that the rewards-earning vehicle in some embodiments is issued by the issuer for an end user's or a customer's account with a bank or another type of financial organization, and such embodiments can be altered to be applicable to the rewards-earning vehicle being issued for an end user's or a customer's account with another type of organization besides a bank or another type of financial organization. Also, throughout this specification, many embodiments use or refer to the use of a credit card, and it is to be understood that such embodiments can be changed to be applicable with the use of debit cards.

In some embodiments, the aforesaid processes are implemented through a software-based platform that is hosted by a computing system that can include a computer network. The platform can turn any bank card or credit card into a virtually co-branded card with any number of loyalty partners linked to the card. Instead of issuing a new product for every partner (e.g., a card for every new loyalty rewards program partner), a bank or another type of card issuer can change any of its regular cards into a co-branded card with one or more of its loyalty partners using the software of the platform. In this way, a legacy card becomes a multi-brand card or even a dynamic multi-branded card via the software-based platform.

Referring back to the prior art, FIG. 1 illustrates a schematic flowchart for co-branded card operations 100. Co-branded cards are known in banking and the credit card industry. Co-branded credit cards connect cardholders to a single loyalty partner. When a cardholder uses such a card to make a purchase, the use is detected by the card issuer (e.g., VISA, MASTERCARD, etc.), and the card issuer informs the bank connected to the card that in turn requests to issue points to a points account of the cardholder that is with the partner. As shown in FIG. 1, the operations 100 associated with a co-branded card include the card issuer 111 issuing a credit card 120 to a cardholder 112. The cardholder can then spend money by using the card, at spend operation 101. The spend transaction is then received and recorded for an account of the cardholder 112 with a bank 113. The spend transaction communication 102 is sent to the bank 113 from the card issuer 111. Then, the bank 113 requests to issue points to an account of the cardholder 112 with a loyalty partner 114. The points issuance request 103 is received and recorded for the account with the partner 114. Once the bank account is debited and the loyalty partner account is credited for the cardholder 112, the cardholder can redeem the points via a redemption operation 104.

There are many differences between systems implementing co-branded cards and the systems disclosed herein implementing multi-branded cards. For example, the systems implementing multi-branded cards allow a single credit card to generate reward points with more than a single partner business. Co-branded cards typically have the logo of the partner printed on them. They involve issuing a new piece of hardware for every new product. Multi-branding on the other hand leverages the regular bank card and turns it into a co-branded card with multiple partners tied to the card using software configurations. This can be described as going from hardware to software. With the same hardware as used by co-branded cards (e.g., co-branded or non-branded credit or debit cards), the system for multi-branding can configure them to behave differently in that they become linked to many loyalty rewards program partners instead of just one for automated conversion of one partner's points to another partner's points. In some cases, the multi-branding can include dynamic multi-branding in that the system for multi-branding cards facilitates attaching multiple partners to the same card and controlling the list of partners at will via automation or manually via user interfaces such as web portals. This way a card issuer or bank is free to add or remove partners from a coalition of loyalty rewards program partners at any time using the self-service portal, and, furthermore, cardholders can choose various types of points to earn and ways to earn such points.

Figure 2:
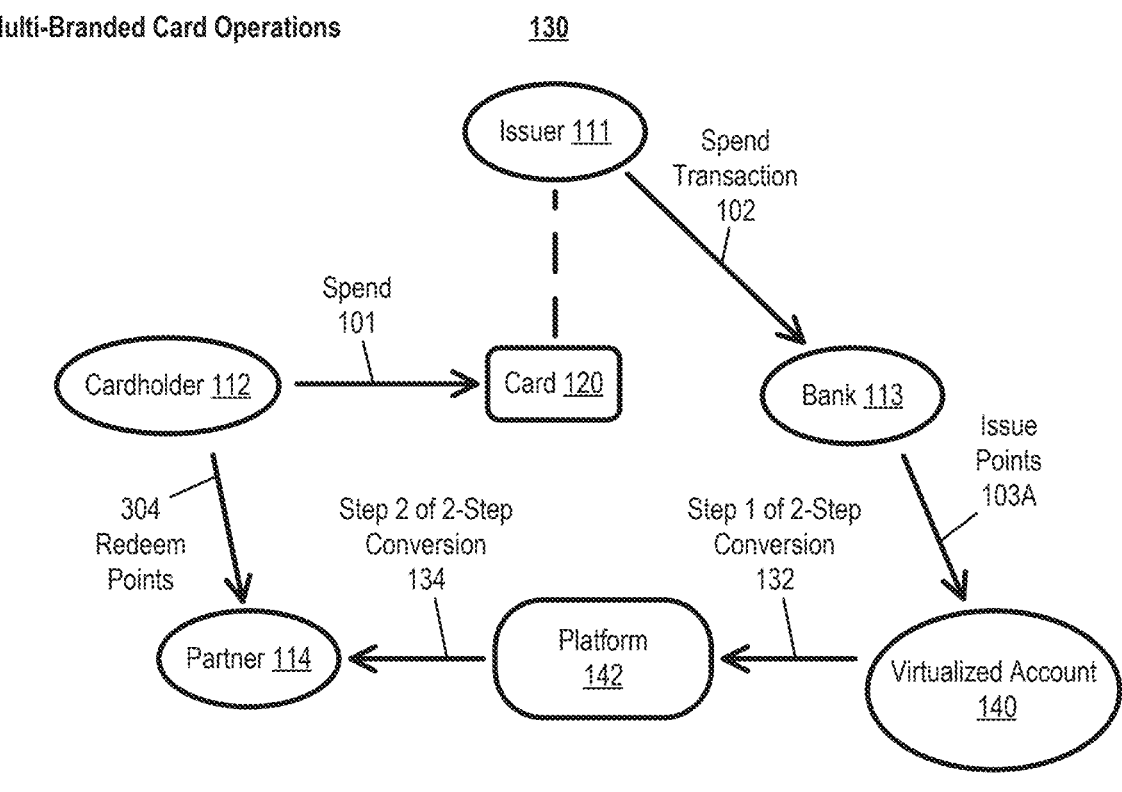
FIG. 2 illustrates a schematic flowchart for multi-branded card operations, in accordance with some embodiments of the present disclosure, and which provide an example technical solution for overcoming the static nature of co-branded card operations.

FIG. 2 illustrates a schematic flowchart for multi-branded card operations 130, in accordance with some embodiments of the present disclosure, and which provides an example technical solution for overcoming the static nature of a co-branded card and its operations 100. A two-step process occurs to simulate co-branding and multi-branding experiences (e.g., see conversion operations 132 and 134). In some embodiments, as shown in FIG. 2, the two-step process (which includes the conversion operations 132 and 134) becomes an added process to the typical operations of co-branded card operations 100 to change the operations to multi-branded card operations 130.

Similarly, as shown in FIGS. 1 and 2, the operations associated with a co-branded card or a multi-branded card include the card issuer 111 issuing the credit card 120 to the cardholder 112. The cardholder can then spend money by using the card, at spend operation 101. The spend transaction is then received and recorded for the account of the cardholder 112 with the bank 113. The spend transaction communication 102 is sent to the bank 113 from the card issuer 111. The spend transaction communication 102 can be bypassed in some embodiments of the multi-branded card operations 130 (although this is not shown in FIG. 2). The reason the communication 102 can be bypassed is that a software-based platform 142 can manage such functionality or replace such functionality with a completely different operation. Also, the bank 113 can request to issue points to an account of the cardholder 112 with the loyalty partner 114.

Also, the points issuance request 103A is received and recorded in a virtual account for the partner 114, such as a virtualize account 140 with the bank 113 or through the software-based platform 142 only—depending on the embodiment. Also, through co-branded card operations 100 or multi-branded card operations 130, once the bank account is debited and the loyalty partner account is credited for the cardholder 112, the cardholder can redeem the points via a redemption operation 104. In some embodiments of the operations 130, the points of the bank account are converted to partner points based on an exchange rate.

In some embodiments, a difference between the co-branded card operations 100 and multi-branded card operations 130 is the conversion from bank points to partner points instead of directly issuing partner points (e.g., see the account 140 that keeps track of the bank points, and see the conversion operations 132 and 134). The conversion from bank points to partner points, performed by the software-based platform 142 and the conversion operations 132 and 134, as shown in FIG. 2, provides for dynamic multi-branding as a feature for any card point system. Thus, banks or credit card issuers can select which partners to enable for their cardholders. And, cardholders can choose which partner from an available list of partners to earn points with when spending money via a credit card (such as card 120).

In some embodiments, a bank and a loyalty partner sign up on the software-based platform 142. The loyalty partner can then make itself available for co-branding or multi-branding via the platform 142, such as via a web portal for loyalty rewards program partners. The bank or a card issuer can then add a card for multi-branding via the platform. Also, the bank can choose the loyalty partner from a list of available partners to become another partner for its multi-branded card. These functions can occur or be started via a web portal for the bank or the card issuer. In such cases, the loyalty partner receives and can accept the offer using the platform, such as via the portal for loyalty rewards program partners. After such steps, by the bank, issuer, and the loyalty rewards program partner, the cardholder for the card can choose the loyalty partner to earn points via the platform 142.

In some examples, the cardholder can interact and make such a choice via a web portal for cardholders. Finally, the user uses the card and earns points with the loyalty partner. This can be done for multiple loyalty partners if the cardholder chooses to link the card with multiple loyalty partners. This multi-linking functionality is not possible via the co-branded card operations 100 and can only be done through the multi-branded card operations 130 or some derivative of the operations 130—such as an alternative set of operations that still use the software-based platform 142 or the conversion operations 132 and 134 of the two-step conversion mentioned herein.

Figure 3:
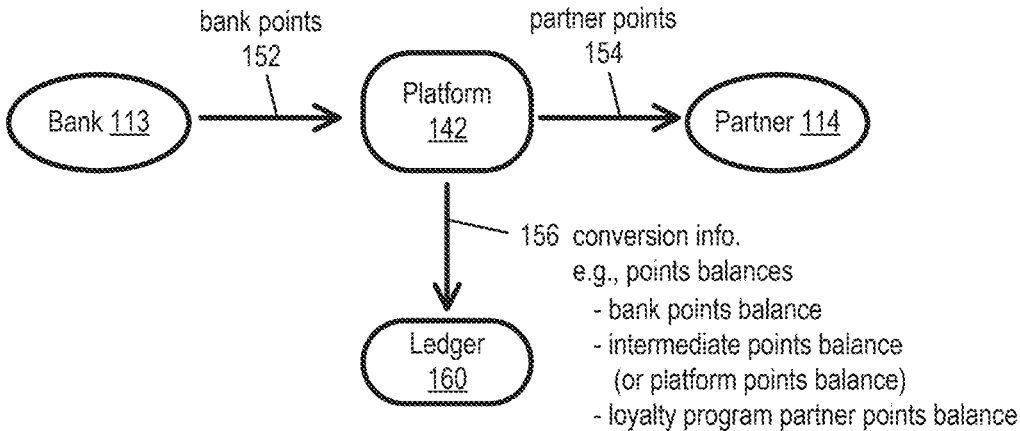
FIG. 3 illustrates a schematic flowchart for an example points exchange of multi-branded cards, in accordance with some embodiments of the present disclosure.

FIG. 3 illustrates a schematic flowchart for the points exchange 150 of multi-branded cards, in accordance with some embodiments of the present disclosure. The points exchange 150 can include, be a part of, or be associated with the multi-branded card operations 130 or some derivative of the operations 130. Also, the points exchange 150 can include, be a part of, or be associated with use of the software-based platform 142 or the conversion operations 132 and 134 of the two-step conversion mentioned herein. The points exchange 150 can be triggered manually or automatically via a computing system, and this can be the case when it is used with the multi-branding card operations 130. In some embodiments, each card issuer, institution, bank, or other organization, which signs up on the platform 142, must specify a price for their point after signing up and before going live. In some example systems, the price of a point for a party is universal and is used to determine the exchange rate with every other partner point. For example, in the context of multi-branding, Bank A prices its point at $0.2, Airline B prices its point at $0.1, and when the cardholder spends money with the corresponding credit card, the cardholder earns 10 bank points. Next, the 10 bank points of Bank A are converted to 20 airline points of Airline B. This conversion can occur always if the cardholder configured the conversion to include earning 100% of their points with Airline B. In some embodiments, such a conversion is automated after the configuration is set by the cardholder. In some examples, there can be an added step where the conversion requires approval from the cardholder—such as an approval step via a cardholder portal.

In general, as shown in FIG. 3, the bank 113 or its computing system interacts with the software-based platform 142 such that the bank points 152 are converted to partner points 154 via the platform. The partner 114 also interacts with platform 142 such that the partner or its computing system is notified and optionally records the conversion. The bank 113 or its computing system can also record the conversion. As shown, the platform 142 records and tracts the conversion via a ledger 160 managed and hosted by the platform. The ledger 160 includes conversion information 156 which includes information from and related to the conversion. The conversion information 156 can include, specifically, points balances of accounts of the parties involved such as the cardholder's balances in accounts with a card issuer (e.g., see the issuer 111), a bank (e.g., see bank 113), a loyalty partner (e.g., see the partner 114), or the platform 142.

Figure 4:
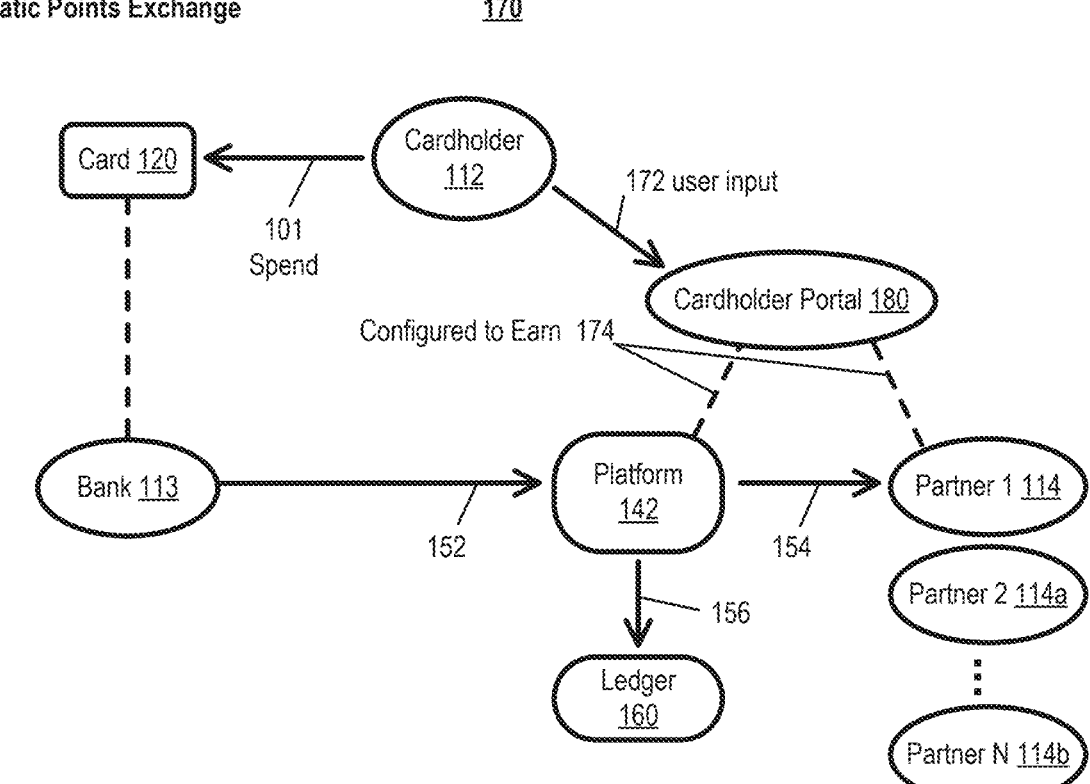
FIG. 4 illustrates a schematic flowchart for an example automatic points exchange of multi-branded cards, in accordance with some embodiments of the present disclosure.

FIG. 4 illustrates a schematic flowchart for the automatic points exchange 170 of multi-branded cards, in accordance with some embodiments of the present disclosure. In general, as shown in FIG. 4, the bank 113 or its computing system interacts with the software-based platform 142 such that the bank points 152 are converted to partner points 154 via the platform. Loyalty rewards program entities or partners (such as partners 114, 114a, and 114b) also interact with platform 142 such that the partners or their respective computing systems are notified and optionally record the conversions. The bank 113 or its computing system can also record the conversion in the automatic points exchange 170. As shown, the platform 142 records and tracts the conversion via the ledger 160 managed and hosted by the platform with the automatic points exchange 170, and similarly the ledger 160 for the automatic points exchange 170 includes the conversion information 156.

Also shown in FIG. 4, the cardholder 112 can spend money by using the card 120, at spend operation 101, and the points earned from such spending can be provided directly or via the software-based platform 142 from loyalty rewards program entities (e.g., see partners 114, 114a, and 114b). The spend transaction is received and recorded for the account of the cardholder 112 with the bank 113 too. Also, the bank 113 requests to issue points to an account of the cardholder 112 with one or more of the loyalty partners depending on user input 172 into the cardholder portal 180. The input 172 is used by the platform to configure the way in which cardholders earn points from the one or more loyalty partners. The configured-to-earn function 174 links the corresponding operations of the platform with the one or more partners to instruct cardholders earning points from the one or more loyalty partners.

As mentioned, cardholder users have the choice to select which partner to be earning points with upon spending on the multi-branded card, using the user portal. Also, the user can select one or more destinations for their points and configure rules to control the flow of points. In some examples, cardholder users are free to select partners from the list of businesses that the bank has added to its card coalition. Users can change their selection choice. The rules that users configure can be time, value, or percentage based, and such selections can be managed via a database of the software-based platform 142 (e.g., see database tables of platform 142 shown in FIGS. 19 to 21).

Furthermore, some embodiments described herein can leverage the use of a universal point pricing model. Most point exchanges happen bilaterally, according to an agreed-upon exchange rate between partners. For example, Partner A and Partner B would agree that x Partner A points are equivalent to y Partner B points, and agree to and execute such a ratio in a contract. The program is that Partner A will have to do the same for each partnership to determine all exchange rates with all its partners. This becomes a significant technical program to manage all the ratios and relationships and execute exchanges based on them as well. With the universal pricing model being used by some embodiments, all partners can set their point price once upon registering on the platform. The universal price can then be used, similar to pricing Fiat currencies to USD, to determine all exchange rates with all other currencies or points on the platform. Also, in such embodiments, the pricing can be updated on a regular but limited basis (such as once a year).

Additionally, the software-based platform 142 can standardize or universalize the way card partners settle finances and operate together. The platform 142 can include standardized partnership integration. Each integration can be done in a custom one-on-one fashion. The platform 142 can standardize such integration using a group of application programming interface (API) endpoints primarily around authentication, authorization, and exchanging of points. Also, the platform 142 can include a single point of integration for contracts, financial settlements, and technical integrations (e.g., see FIG. 15). As mentioned herein, credit card partners adopt a one-on-one process for generating and executing legal contracts, financial settlements, and technical integrations. However, all three aspects of the process can be repeated for every partnership and this concept is leveraged by the platform 142 and related systems and methods. Using the platform 142, partners can draft and execute a single contract after which they perform a single technical integration following standard application programming interfaces (APIs), and settle regularly once with all partners (such as through the platform) instead of settling with every partner individually.

In some embodiments, at least some of the APIs are protected with an authentication scheme. In such examples, the caller (whether widget or direct API call) is authenticated initially and acquires an access token before making API calls. In such examples, the access token must be attached to all authenticated API calls.

Figure 5:
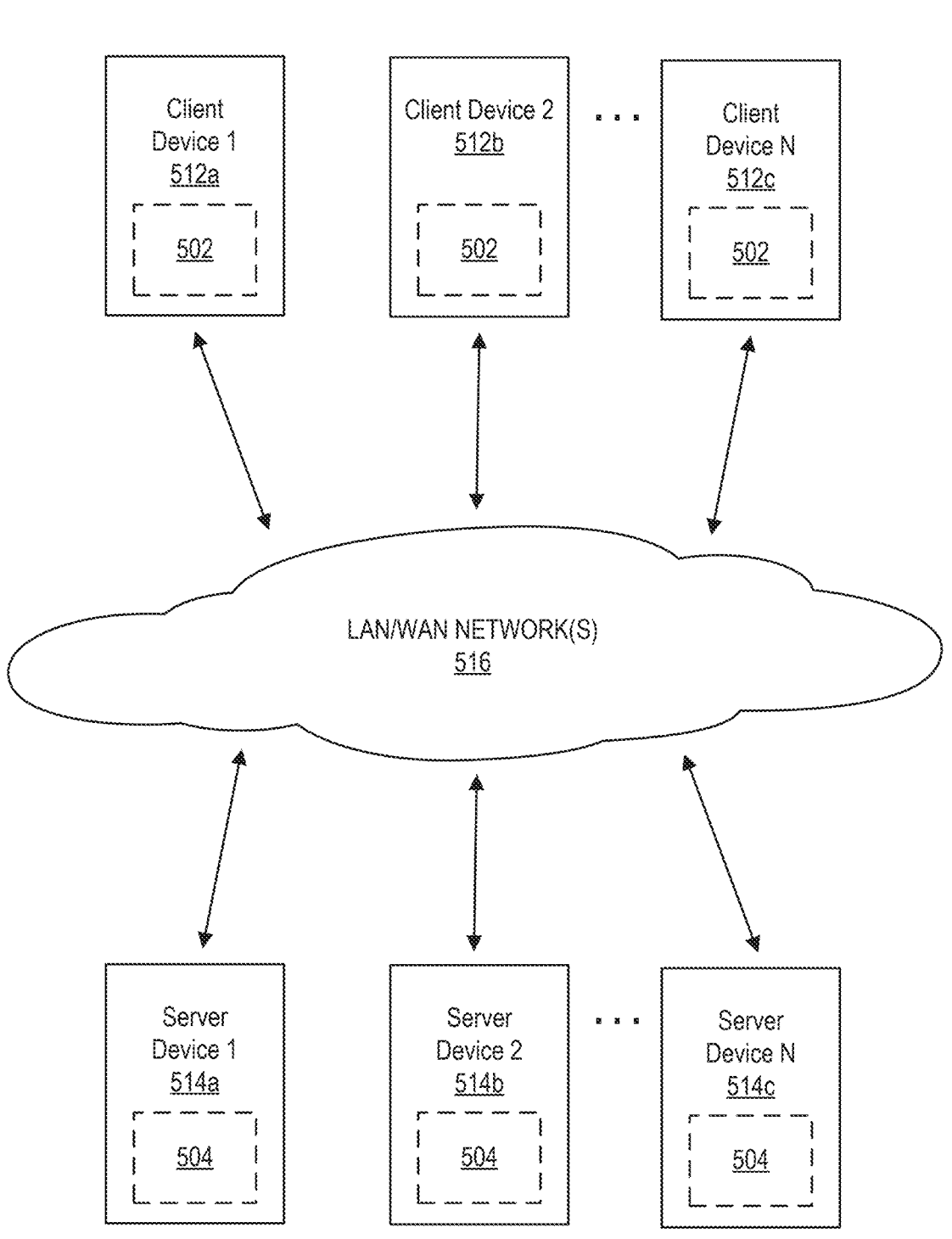
FIG. 5 illustrates an example computer network to implement technologies disclosed herein, in accordance with some embodiments of the present disclosure.

FIG. 5 illustrates an example computer network 500 to implement technologies disclosed herein, including the software-based platform 142, in accordance with some embodiments of the present disclosure. Typically, banks issue co-branded cards with a single loyalty partner, most notably airlines. Users of the card earn points with the loyalty partner when they spend with the co-branded card. Then such cardholders can redeem their points for a product or service with the loyalty partner. Co-branded cards are special programs that involve issuing a new card product with a partner logo and are typically maintained by teams different from the one that manages the standard loyalty point program. The problem with such products or services is that they are static and cannot be readily updated as programs change or as there is a demand to add new programs and loyalty rewards program partners to the card. The platform 142, which can be implemented via network 500, can overcome such a problem by providing a solution that allows for the dynamic or manual additions of new loyalty rewards programs and partners to the card without reissuing a new card. Thus, the legacy card is enhanced with new benefits and functionality, and the cardholder has more flexibility for earning points through a diversity of partners through one card.

Some of the computing systems disclosed herein as well as the network 500 include a system frontend 502 of the software-based platform 142 and a system backend 504 of the platform, as shown in FIG. 5. The computer network 500 can implement any of the methods, operations, modules, engines, or other types of components of the systems disclosed herein. The computer network 500 is shown including client devices (e.g., see client devices 512*a*, 512*b*, and 512*c*). As shown, the system frontend 502 can be hosted and executed on the client devices of the computer network 500. The computer network 500 is also shown including server devices (e.g., see server devices 514*a*, 514*b*, and 514*c*). As shown, the system backend 504 can be hosted and executed on the server devices of the computer network 500.

In some embodiments, the system frontend 502 of the platform 142, or at least the user interfaces of the frontend, can be created and implemented through custom-created components or implemented through components of known libraries such as components associated with REACT libraries or the like that use a declarative programming paradigm and are modular and reusable. In such embodiments and others, the system backend 504 of the platform 142 can use and be configured for a cross-platform runtime environment that can run on various operating systems (such as Windows, Linux, Unix, macOS, etc.). For example, the backend 504 can use NODE.JS. For managing data used by the platform 142, a relational database management system (RDBMS) can be used that interacts with the system frontend 502 and the system backend 504. In some embodiments, the RDBMS used by the network 500 emphasizes extensibility and SQL compliance in its features, such as PostgreSQL.

Using a rewards-earning vehicle issuer part of the system frontend 502 (such as a card issuer part or the issuer portal mentioned herein), banks can access any loyalty partner that has signed up on the platform via a part program part of the frontend 502 (such as the loyalty rewards program partner portal mentioned herein). This can occur when the partner has made itself available for co-branding opportunities via the loyalty rewards program partner portal or the frontend 502 in general. The bank can request from the loyalty partner, using the platform and via the frontend 502, to join its co-branding list for a chosen rewards-earning vehicle (e.g., a chosen card). Upon the approval of both the bank and the loyalty partner via their respective frontends of the platform, necessary records are stored in the database to keep track of the partnership and the storage of such records can occur in the system backend 504. The ability to earn points with the approved partners will be made available to the customers (e.g., cardholders of credit cards) at this point. The customer will then be able to choose, from a list in the customer portal or a customer portion of the frontend 502 in general, which loyalty partner they want to earn points with when spending with the issuer's rewards-earning vehicle (e.g., a credit card). The user can change the selection of a loyalty partner or program and may choose more than a single partner or program to earn points through the customer portal or the frontend 502 in general, depending on the embodiment. The user can configure conditions to evaluate in order to determine where to earn points through such frontends of the platform. The conditions can be time, value, or percentage based. This functionality can be provided via the customer portal specifically or the customer portion of the system frontend 502 in general. An example configuration can include 50% with partner A and 50% with partner B. Or, 100% with partner A up until June, then 50% with partner B and 50% with partner C. Or, 100% with partner A for spends >$100 otherwise 100% with partner B. These are just some examples of the combinations in which a customer can configure the earning of points through the platform with one rewards-earning vehicle.

Also, the computer network 500 is shown including one or more LAN/WAN networks 516 which is shown communicatively coupling the server devices hosting the system backend 504 and the client devices hosting the system frontend 502. The LAN/WAN network(s) 516 can include one or more local area networks (LAN(s)) or one or more wide area networks (WAN(s)). The LAN/WAN network(s) 516 can include the Internet or any other type of interconnected communications network. The LAN/WAN network(s) 516 can also include a single computer network or a telecommunications network. More specifically, the LAN/WAN network(s) 516 can include a local area network (LAN) such as a private computer network that connects computers in small physical areas, a wide area network (WAN) to connect computers located in different geographical locations, or a metropolitan area network (MAN)—also known as a middle area network—to connect computers in a geographic area larger than that covered by a large LAN but smaller than the area covered by a WAN.

At least each shown component of the computer network 500 can be or include a computer system which can include memory that can include media. The media can include or be volatile memory components, non-volatile memory components, or a combination of such. In general, each of the computer systems can include a host system that uses the memory. For example, the host system can write data to the memory and read data from the memory. The host system can be a computing device such as a desktop computer, laptop computer, network server, mobile device, or such computing device that includes a memory and a processing device. The host system can include or be coupled to the memory so that the host system can read data from or write data to the memory. The host system can be coupled to the memory via a physical host interface. The physical host interface can provide an interface for passing control, address, data, and other signals between the memory and the host system.

As mentioned, with respect to some embodiments, disclosed herein are computerized methods for converting and exchanging loyalty rewards (such as loyalty points), as well as a non-transitory computer-readable storage medium for carrying out technical operations of the computerized methods. The non-transitory computer-readable storage medium has tangibly stored thereon, or tangibly encoded thereon, computer-readable instructions that when executed by one or more devices (e.g., one or more personal computers or servers) cause at least one processor to perform a method for converting and exchanging loyalty rewards (e.g., loyalty points).

With respect to some embodiments, a computing system is provided that includes at least one computing device configured to generate and use loyalty rewards conversion and exchange processes. And, with respect to some embodiments, a corresponding method is provided to be performed by at least one computing device. In some example embodiments, computer program code can be executed by at least one processor of one or more computing devices to implement functionality in accordance with at least some embodiments disclosed herein; and the computer program code being at least a part of or stored in a non-transitory computer-readable medium.

Figure 6:
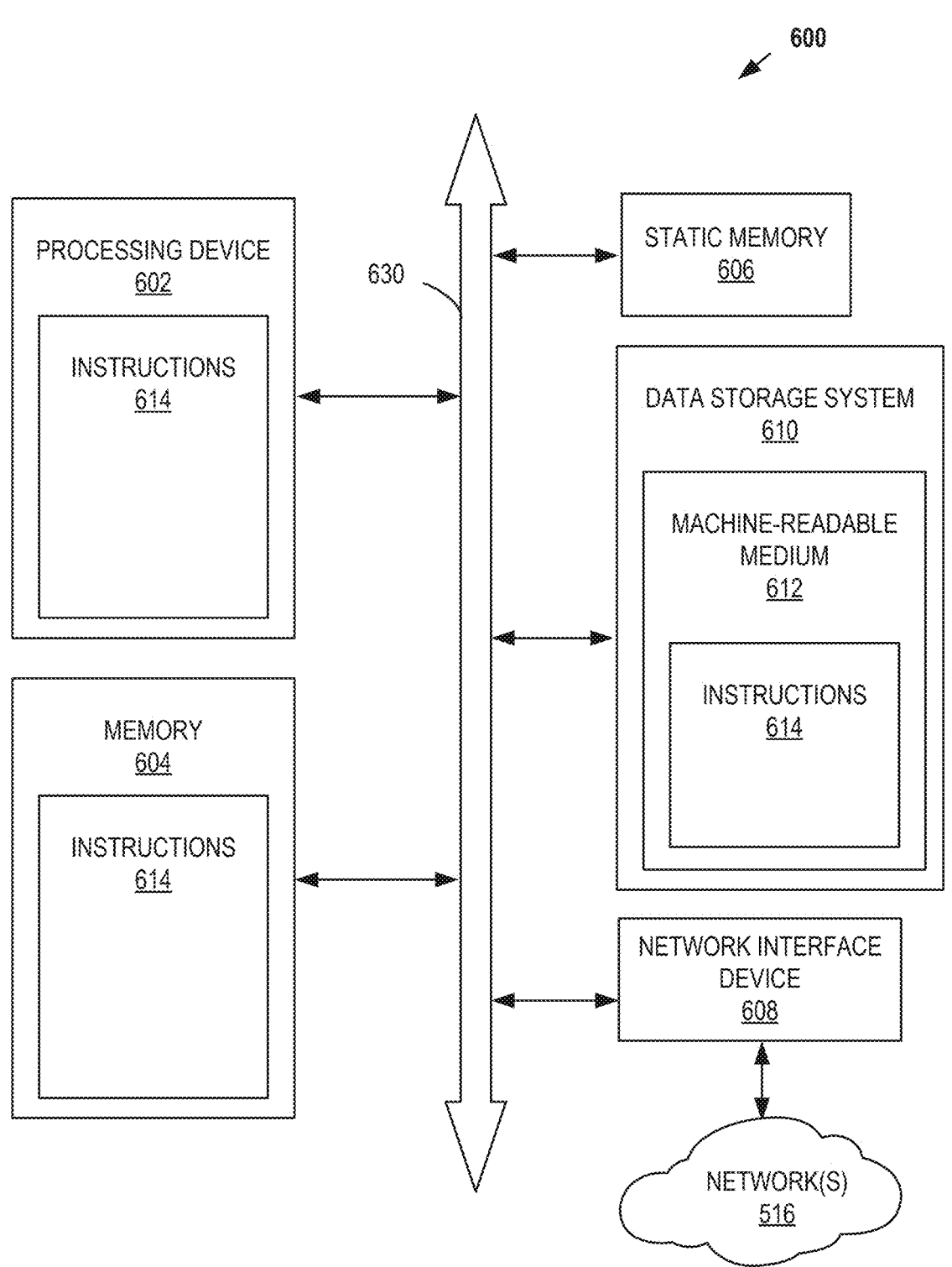
FIG. 6 illustrates a block diagram of example aspects of an example computing system, in accordance with some embodiments of the present disclosure.

FIG. 6 illustrates a block diagram of example aspects of an example computing system 600, in accordance with some embodiments of the present disclosure. FIG. 6 illustrates parts of the computing system 600 within which a set of instructions, for causing a machine of the computing system 600 to perform any one or more of the methodologies discussed herein can be executed (such as any one or more of methods 800 to 1400 or operations found in FIGS. 2 to 4 and 22 to 24). In some embodiments, the computing system 600 can correspond to a host system that includes, is coupled to, or utilizes memory or can be used to perform the operations of a controller (e.g., to execute an operating system to perform operations corresponding to any one of the client or server devices shown in FIG. 5). In alternative embodiments, the machine can be connected (e.g., networked) to other machines in a LAN, an intranet, an extranet, or the Internet. The machine can operate in the capacity of a server or a client machine in client-server network environment, as a peer machine in a peer-to-peer (or distributed) network environment, or as a server or a client machine in a cloud computing infrastructure or environment. In some embodiments where a cloud computing infrastructure is used, the infrastructure utilizes an on-demand cloud computing platform and APIs, such as AWS.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein (such as any one or more of methods 800 to 1400 or operations found in FIGS. 2 to 4 and 22 to 24).

The computing system 600 includes a processing device 602, a main memory 604 (e.g., read-only memory (ROM), flash memory, dynamic random-access memory (DRAM), etc.), a static memory 606 (e.g., flash memory, static random-access memory (SRAM), etc.), and a data storage system 610, which communicate with each other via a bus 630. The processing device 602 represents one or more general-purpose processing devices such as a microprocessor, a central processing unit, or the like. More particularly, the processing device can be a microprocessor or a processor implementing other instruction sets, or processors implementing a combination of instruction sets. The processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 614 for performing the operations discussed herein. The computing system 600 can further include a network interface device 608 to communicate over the LAN/WAN network(s) 516 of FIG. 5. The data storage system 610 can include a machine-readable storage medium 612 (also known as a computer-readable medium) on which is stored one or more sets of instructions 614 or software embodying any one or more of the methodologies or functions disclosed herein (such as any one or more of methods 800 to 1400 or corresponding operations found in FIGS. 2 to 4 and 22 to 24). The instructions 614 can also reside, completely or at least partially, within the main memory 604 or within the processing device 602 during execution thereof by the computing system 600, the main memory 604 and the processing device 602 also constituting machine-readable storage media.

In some embodiments, the instructions 614 include instructions to implement functionality corresponding to the client devices and server devices shown in FIG. 5 (e.g., see system frontend 502 and system backend 504 shown in FIG. 5). While the machine-readable storage medium 612 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

In some embodiments, the instructions 614 include instructions to implement functionality corresponding to artificial intelligence (AI) or machine learning disclosed herein (which in some embodiments can enhance the computerized decision making and determinations described herein). For the purposes of this disclosure, artificial intelligence includes any form of intelligence implemented by a machine, such as a computing system (e.g., see computing system 600). In some embodiments, AI disclosed herein includes machine learning. In some embodiments, AI disclosed herein includes search and mathematical optimization, formal logic, artificial neural networks (ANNs), methods based on statistics or probability, or any combination thereof. In some embodiments, machine learning disclosed herein includes supervised learning or unsupervised learning.

Figure 7:
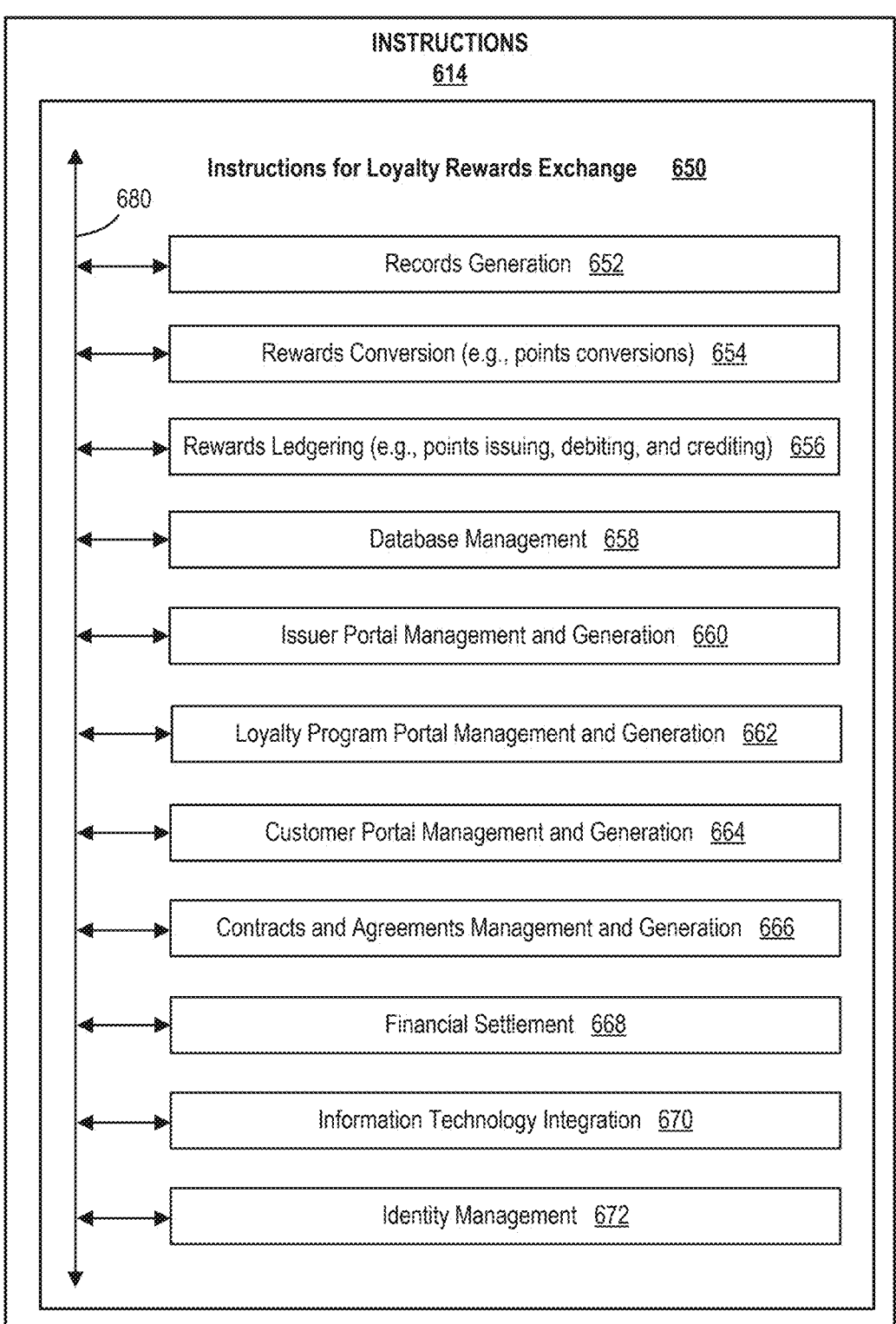
FIG. 7 illustrates example computer-executable instructions of the computing system of FIG. 6 that are configured to provide some of the steps of the methods described herein, in accordance with some embodiments of the present disclosure.

FIG. 7 illustrates example computer-executable instructions 614 and 650 that are configured to provide some of the operations and the steps of the methods described herein, in accordance with some embodiments of the present disclosure. As depicted, loyalty rewards exchange instructions 650 are sub-instructions of instructions 614. In other words, instructions 614 include instructions 650. Also, as depicted, sub-instructions 652 to 672 are sub-instructions of instructions 650. In other words, instructions 650 include sub-instructions 652 to 672. As a part of instructions 614, the processing device 602 is configured to execute instructions 650 at its sub-instructions 652 to 672 for performing the operations discussed (e.g., see any one or more of the steps of methods 800 to 1400 or operations found in FIGS. 2 to 4 and 22 to 24). The instructions 650 can reside, completely or at least partially, within the main memory 604 or within the processing device 602 during execution thereof by the computing system 600, the main memory 604 and the processing device 602 also constituting machine-readable storage media. And, in some embodiments, the instructions 650 include instructions to implement functionality corresponding to the client devices and server devices shown in FIG. 5 (e.g., see system frontend 502 and system backend 504 shown in FIG. 5). As shown, the instructions 650 include sub-instructions 652 to 672, which can interact with each other through a communications bus 680. The bus 680 can be implemented via computer hardware or software.

Sub-instructions 652 are configured to generate records related to loyalty points exchange or rewards exchange, such as the functionality provided by step 802 of method 800 shown in FIG. 8. In some embodiments, the instructions 652 are configured to generate, through a multi-branding platform or dynamic multi-branding platform (e.g., platform 142), records that include relationship information linking any type of loyalty rewards-earning vehicle, of a corresponding issuer of that vehicle, to loyalty rewards program entities to multi-brand the loyalty rewards-earning vehicle. In some more specific embodiments, the instructions 652 are configured to generate, through a multi-branding platform or dynamic multi-branding platform, records that include relationship information linking a rewards-earning vehicle of a rewards-earning vehicle issuer to loyalty rewards program entities to multi-brand the vehicle.

Sub-instructions 654 are configured for points or other types of rewards conversions related to loyalty points exchange or rewards exchange, such as the functionality provided by step 804 of method 800 shown in FIG. 8. In some embodiments, the instructions 654 are configured to change, convert, or exchange issuer rewards or points, of the issuer of the loyalty rewards-earning vehicle, to loyalty rewards program rewards or points of one of the loyalty rewards program entities according to a rewards or points conversion rule. The issuer rewards (e.g., points) are issued by the issuer to an end user or a customer of the issuer or the loyalty rewards program entity in such examples. In some more specific embodiments, the instructions 654 are configured to convert issuer rewards of the rewards-earning vehicle issuer to loyalty rewards program rewards (e.g., points) of one of the loyalty-program entities according to a rewards or points conversion rule of the dynamic multi-branding platform. The rewards-earning vehicle issuer rewards are issued by the issuer to a customer of the rewards-earning vehicle in such examples. With multi-branding of the vehicle or card, not only does the multi-branding connect multiple loyalty accounts to the vehicle or card, but is also capable of processing a single payment from multiple accounts according to configurations (such as a configuration according to transaction size or type). Such multi-branding functionality can be implemented through sub-instructions 652 and 654 as well as other sub-instructions of instructions 650.

In some embodiments, the sub-instructions 654 are configured for the conversion of the issuer rewards to loyalty-program rewards to occur in response to the issuer rewards issuing to the customer after a selected amount of time or on a selected day of a week, a month, or a billing cycle after the issuance of the rewards.

Sub-instructions 656 are configured for rewards or points ledgering (e.g., ledgering for rewards or points issuing, debiting, and crediting), such as the functionality provided by operations related to the ledger 160 depicted in FIGS. 3, 4, 23, and 24). The stored records are part of or include fields of a ledger. Generally, the instructions 656, when executed, provide the management of a ledger of or interacting with the platform (such as platform 142). The ledger can include a list of transactions occurring via the platform which can be separately stored in a database in some examples. Included with the sub-instructions 656 or elsewhere in the software implementation of the platform 142 and its crediting and debiting functionality, the communication with partner platforms to debit and credit customer or cardholder balances can occur or be enhanced through webhooks. The webhooks can be configured by users of the partners via the partner portals. In addition or alternatively to webhooks, other methods of enhancing or controlling a web page or web application behavior can be used that use standard or custom callbacks. Also, the instructions 656 are configured for rewards or points ledgering can use webhooks or an alternative method of enhancing or controlling web application behavior or application actions in general.

The ledger can track and document issuer rewards (such as card issuer points) and loyalty rewards program rewards transacted as well as corresponding liabilities on respective balance sheets of the issuer and the loyalty rewards program entities. According to an example of the instructions, when the rewards are moved from the issuer balance sheet to the loyalty rewards program entity balance sheet via the ledger, so are the corresponding liabilities. Also, when the rewards are returned from the program entity balance sheet to the issuer balance sheet via the ledger, so are the corresponding liabilities.

The instructions 656 also implement management and tracking of the movement or return of the rewards (e.g., points) is finalized via a recording on the ledger of a settlement between the issuer and the loyalty rewards program entity, and the movement or return of the rewards and the settlement recording occurs regularly by a default setting of the platform or on a regular basis that is agreed upon by the program entity and the issuer (also managed and tracked by the instructions 656 at least partially). When converting from issuer to program rewards, there can be two transactions that occur via the instructions. Also, in some cases, the regular basis can include a monthly basis in that the rewards are moved and the settlement is recorded once per month on a regular basis. Also, the specifics of the regular basis of the movement of rewards and recording of the settlements are selected by the issuer and are the same for each loyalty rewards program entity linked to the rewards-earning vehicle.

Also, the sub-instructions 656 are configured to interoperate with the instructions 652 and 654 in the generation and conversion of issuer rewards owned by a user to platform rewards owned by the user. And, the sub-instructions 652, 654, and 656 can interoperate such that the corresponding liability is deleted from the balance sheet of the issuer via the ledger and the corresponding liability is created on the balance sheet of the platform via the ledger. And, instructions 654 implement conversion of platform rewards owned by the user to program rewards owned by the user. Also, the sub-instructions 652, 654, and 656 can interoperate such that the corresponding liability is deleted from the balance sheet of the platform and the corresponding Liability is created on the balance sheet of the loyalty rewards program. Within the instructions 654 for the conversion process, the whole transaction is not atomic; but, each sub-transaction is atomic. For example, with the instructions 654, due to a software outage with the program, only the first sub-transaction may succeed. Therefore, liability is left with the platform. The platform can continue to retry to finalize the whole transaction until we reach the retrial limit or the transaction succeeds. Otherwise, there can be a need to reverse the first sub-transaction if the retrial limit is reached and without the successful completion of the second sub-transaction. Such functionality can be implemented through the interoperation of instructions 652, 654, and 656. Also, the aforesaid instructions can interoperate with instructions 668, which are configured for financial settlement. In some embodiments, there are two modes to operate on settlements. The platform handles the financial settlements and money movement, such as via instructions 668. Thus, the platform pays the programs and receives payment from the issuers. In such cases, the settlement agreement is between the platform and each of the issuer and the program individually, and such functionality can also be managed through instructions 666 configured for contracts and agreements management and generation. On the other hand, the platform only provides settlement records necessary for completing the settlement directly between the issuer and the program in the other mode. In this case, the settlement agreement is directly between issuers and programs. The last-mentioned example can also be implemented via instructions 666 and 668.

Sub-instructions 658 are configured to provide database management for rewards exchanges and related operations such as the functionality provided by step 1202 in method 1200 shown in FIG. 12. The database management can be implemented through a database management system (DBMS0, which can also be implemented via instructions 658, and which can include tables for storing and managing aspects of the platform and its users (e.g., see the tables shown in FIGS. 17, 19, 20, and 21). In some embodiments, the instructions 658 are configured for storing the generated records in a database of the platform or a dynamic multi-branded platform. And, via the instructions or the DBMS specifically, the stored records are accessible by end users of the platform according to permissions and user credentials of the end users. The end users can include cardholders or other types of customers or end users of rewards-earning vehicles and administrators of the issuer of such vehicles or credit cards, the loyalty rewards program entities, and the platform. The end users can access the stored records via respective graphical user interfaces of the issuer, the loyalty rewards program entities, and the platform, which can be implemented at least partially by the sub-instructions 658 as well as Sub-instructions 660, 662, and 664 configured for providing and controlling the GUIs or corresponding web portals in some examples. In some embodiments, the instructions 660 to 664 are configured to provide the end users access to the stored records via respective graphical user interfaces of a rewards-earning vehicle issuer (e.g., a credit card issuer), a loyalty rewards program entity, and the platform.

Also, as shown, sub-instructions 660 are configured to provide issuer portal management and generation such as the functionality provided by steps 1204 and 1210 of method 1200 shown in FIG. 12. Generally speaking, the instructions 660 are configured to distribute an issuer portal (e.g., a credit card issuer portal) over a computer network so that end users of the issuer can interact with the records and the computing system 600. Also, the instructions 660 are configured to provide for the issuer administrator to select loyalty rewards program entities to become optionally linkable with a credit card product or different type of rewards-earning vehicle issued by the credit card or rewards-earning vehicle issuer depending on the embodiment.

Sub-instructions 662 are configured to provide loyalty rewards program partner portal management and generation such as the functionality provided by steps 1206 and 1212 of method 1200. Generally speaking, the instructions 662 are configured to distribute a loyalty rewards program portal over the network so that end users of a loyalty rewards program entity can interact with the records and the computing system 600. Also, the instructions 662 are configured to provide for the loyalty partner administrator to accept the issuer's selection to make it an optionally linkable program with the rewards-earning vehicle product or the rewards-earning vehicle depending on the embodiment.

Sub-instructions 664 are configured to provide end-user, customer, or cardholder portal management and generation such as the functionality provided by steps 1208, 1214, 1216, and 1218 of method 1200. Generally speaking, the instructions 664 are configured to distribute a cardholder portal or customer end-user portal over the computer network so that cardholders or customers can interact with the records and the computing system 600. Also, depending on the embodiment, the instructions 664 are configured to provide for the cardholder selecting one of the loyalty rewards program entities to be linked with the credit card of the cardholder or the vehicle of the customer, manually via the cardholder or customer portal. These instructions can also partially implement the linking of program entities according to the selection of the one of the loyalty rewards program entities to be linked with the credit card of the cardholder or the vehicle of the customer depending on the embodiment. These instructions can also partially implement the deriving of computer-readable instructions based on the selection, wherein the derived instructions optionally include a time-based condition, a value-based condition, or a combination thereof for determining a number of rewards (e.g., points) to convert from issuer rewards to loyalty rewards program rewards of the selected loyalty rewards program entity.

In some embodiments, the administrators of the issuer and the loyalty rewards program entities must approve conditions of their relationships within the relationship information before the conditions are stored in the database of the platform. And, in some cases, the customers (e.g., the cardholders) must approve linking a loyalty rewards program entity to the rewards-earning vehicle (e.g., credit card) before the link between the entity and the rewards-earning vehicle is stored in the database of the platform and before the converting of the issuer rewards to the loyalty rewards program rewards.

In some embodiments, the instructions related to portal generation and management are configured to distribute a customer portal (e.g., cardholder portal) over a computer network. The customer portal in such cases is configured to facilitate customer interactions with the platform, and the customer interactions can include the customer selecting one of the loyalty rewards program entities to be linked with the vehicle (e.g., credit card) of the customer (e.g., cardholder).

Also, the instructions related to portal generation and management can be configured to distribute an issuer portal over a computer network. The issuer portal can be configured to facilitate issuer administrator interactions with the platform. And, the issuer administrator interactions can include the issuer administrator selecting loyalty rewards program entities to become linkable with a rewards-earning vehicle product issued by the issuer. In some examples, the selection of one of the loyalty rewards program entities to be linked with the rewards-earning vehicle of the customer is automated according to computer-recorded instructions.

In some cases, the computer-recorded instructions for selecting a loyalty rewards program entity for the rewards-earning vehicle (e.g., credit card) and for determining a number of rewards (e.g., points) to convert from issuer rewards to loyalty rewards program rewards of the selected loyalty rewards program entity includes a time-based condition. In some cases, the computer-recorded instructions for selecting a loyalty rewards program entity for the rewards-earning vehicle and for determining a number of rewards to convert from issuer rewards to loyalty rewards program rewards of the selected loyalty rewards program entity include a value-based condition. Also, the computer-recorded instructions for selecting a loyalty rewards program entity for the rewards-earning vehicle and for determining a number of rewards to convert from issuer rewards to loyalty rewards program rewards of the selected loyalty rewards program entity can include a time-based condition and a value-based condition. The value-based condition can be dependent on a total number of rewards designated to the loyalty rewards program entity per cycle. In some cases, the computer-recorded instructions for selecting a loyalty rewards program entity for the rewards-earning vehicle and for determining a number of rewards to convert from issuer rewards to loyalty rewards program rewards of the selected loyalty rewards program entity include a percentage-based condition. In some cases, the value-based condition is dependent on the type of seller of products or services associated with the rewards to be converted.

As an example, through these instructions, if the user attempts to purchase an item for $100 and the user has three loyalty accounts (Account 1, Account 2, and Account 3) connected to a credit card, the $100 can be paid for from all accounts in order of priority (configured by the user). Once the $100 is fulfilled, then there is no need to process points (such as debit the points) from the remaining accounts. Thus, if there is $150 worth of points in Account 1, the processes can remove $100 worth of points from Account 1, and will not interact with Account 2 and Account 3. And, determining the total number of points across accounts, to be removed can be dependent on the size of the transaction (such as the amount of points needed to cover a transaction). Also, the way to remove points and how to divide the removal amongst accounts can be configured by the customer end user via the cardholder or customer portal implemented via instructions 664.

Referring to the value-based conditions, as an example, if a transaction is greater than $100 then the system 600 can process points from Account 1; but, if it is less than $100 then the system processes points from Accounts 2 and 3 in order of priority. Referring to where the value-based condition is dependent on a percentage of points designated to the loyalty rewards program entity per cycle, the conditions can be complex. For instance, the conditions can be complex, as in the system 600 can apply multiple conditions to determine the end user choice. The conditions can also be simple, for example, the default configuration of simply ordering the priority of payment accounts. Such configurations can be implemented via the sub-instructions 654 and configured via the sub-instructions 664. As an example of a simple percentage-based usage, for any transaction, pay for 50% of the transaction from Account 1 and 50% of the transaction from Account 2. Remove the necessary amount of points needed from each account to pay for 50% of the transaction. These percentages are examples, and any groups of percentages for dividing the use of points from accounts can be utilized as long as they add up to 100%. As an example of the complex percentage-based usage, a combination of value and percentage conditions can be used. For instance, for transactions greater than $100, such payments are paid in full, from Account 1; whereas, for transactions less than $100, the system removes 30% of the transaction value from Account 2 and 70% from Account 3. Again, these percentages are examples, and any groups of percentages for dividing the use of points from accounts can be utilized as long as they add up to 100%.

In some embodiments, via the instructions, the computing system can provide, through the platform, user interfaces configured to permit rewards-earning vehicle issuers (e.g., credit card issuers), loyalty rewards program entities, and customers (e.g., cardholders) to register with the platform. And, in such cases and others, via the instructions, the computing system can provide, through the platform, one or more fields in the interfaces configured to permit a loyalty rewards program entity to link with a rewards-earning vehicle issuer to be available for selection by a customer. In some embodiments, the instructions facilitate providing, by the platform, one or more fields in the interfaces configured to permit a rewards-earning vehicle issuer to add a rewards-earning vehicle product to the platform to be available for selection by a loyalty rewards program entity for linking the rewards-earning vehicle product to the loyalty rewards program entity. In some embodiments, the instructions facilitate providing, by the platform, one or more fields in the interfaces configured to permit a rewards-earning vehicle issuer to select which loyalty rewards program entities are available for selection by a customer (e.g., cardholder). In some embodiments, the instructions facilitate providing, by the platform, one or more fields in the interfaces configured to permit a loyalty rewards program entity to accept or refuse requests to be linked to a rewards-earning vehicle product of a rewards-earning vehicle issuer (e.g., a credit card product of a credit card issuer).

In some embodiments, via the instructions, the computing system provides the point conversion rule. And, the rule can include an exchange rate. Also, the point conversion rule can include an issuer's price for a point issued by the issuer and a loyalty rewards program entity's price for a point issued by the corresponding loyalty rewards program entity, and wherein the prices are universal and a basis for determining the exchange rate.

Figure 15:
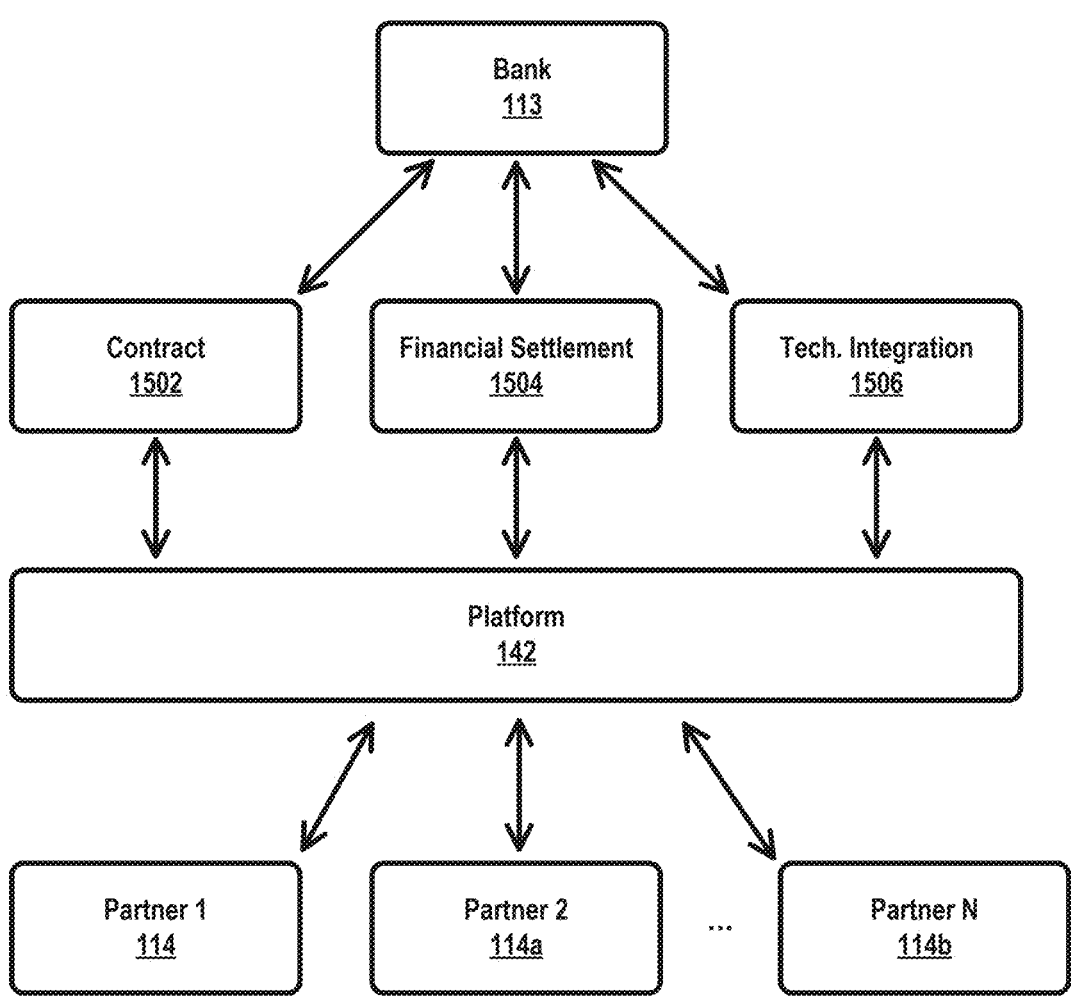
FIG. 15 illustrates a schematic flowchart for a single-point integration of financial settlements, partnership contracts, and the technical integration between card issuers and loyalty rewards program entities, in accordance with some embodiments of the present disclosure.

Sub-instructions 666 are configured to provide contracts and agreements management and generation, such as the functionality illustrated in the single point integration 1500 of contracts 1502 (e.g., see FIG. 15). Sub-instructions 668 are configured to provide financial settlements, such as the functionality illustrated in the single point integration 1500 of financial settlements 1504. Sub-instructions 670 are configured to provide information technology integration, such as the functionality illustrated in the single point integration 1500 of technical integrations 1506. Sub-instructions 672 are configured to provide identity management functionality, such as the functionality illustrated in FIGS. 17 and 18.

FIGS. 8 to 14 illustrate example methods of the technologies disclosed herein, in accordance with some embodiments of the present disclosure. In some examples, one or more of the methods can be combined with any other one or more of the methods disclosed herein. Although aspects of methods related to the converting and exchanging loyalty points, it is to be understood that the technologies disclosed by the methods can be applied to other applications and implemented for other purposes such as conversion and exchange of other types of benefits or rewards or other types of currencies, commodities, or securities besides points.

FIG. 8 shows a method 800, implemented by a computing system (such as the computing system 600), for converting and exchanging loyalty points. In some examples, method 800 can be combined with any one or more of the methods disclosed herein. Although aspects of method 800 relate to the converting and exchanging loyalty points, it is to be understood that the technologies disclosed by the method 800 can be applied to other applications and implemented for other purposes such as conversion and exchange of other types of benefits or rewards or other types of currencies, commodities, or securities.

The method 800 includes, at step 802, generating, by a computing system (e.g., see computing system 600 depicted in FIG. 6) records that include relationship information linking a credit card of a credit card issuer to a plurality of loyalty rewards program entities (e.g., see instructions 652 shown in FIG. 7). At step 804, the method 800 includes converting, by the computing system, card issuer points of the credit card issuer to loyalty rewards program points of one loyalty rewards program entity of the plurality of loyalty rewards program entities according to a predetermined points conversion rule. In some embodiments, the conversion is performed by a points exchange engine of the computing system (e.g., see instructions 654 shown in FIG. 7, which can implement the engine). And, the predetermined points conversion rule can be static or determined dynamically when a situation changes or regularly and periodically (e.g., on a monthly basis).

In some examples, the point conversion rule includes an exchange rate. And, the point conversion rule can include an issuer's price for a point issued by the credit card issuer and a loyalty rewards program entity's price for a point issued by the loyalty rewards program entity. Further, the issuer's and loyalty rewards program entity's prices can be a basis for determining the exchange rate.

In some embodiments, the loyalty rewards program points are issued by the one loyalty rewards program entity to a corresponding loyalty rewards program account of a cardholder of the credit card after the conversion and automatically according to the point conversion rule. Also, the conversion of the card issuer points to the loyalty rewards program points can include a two-step conversion including converting the card issuer points to intermediate points and then converting the intermediate points to the loyalty rewards program points.

At step 806, the method 800 includes issuing, by the computing system, the loyalty rewards program points to a corresponding loyalty rewards program account of a cardholder of the credit card after the conversion and automatically according to the point conversion rule. In some embodiments, the card issuer points are issued by the credit card issuer to a corresponding cardholder account of the cardholder before the conversion. Also, in some examples, the issuing of the loyalty rewards program points to the loyalty rewards program account follows removing the card issuer points from the cardholder account. Such steps can be implemented at least partially through instructions 656 and 658, shown in FIG. 7.

FIG. 9 shows a method 900, implemented by a computing system (such as the computing system 600), for converting and exchanging loyalty points. In some examples, method 900 can be combined with any one or more of the methods disclosed herein. Although aspects of method 900 relate to the converting and exchanging loyalty points, it is to be understood that the technologies disclosed by the method 900 can be applied to other applications and implemented for other purposes such as conversion and exchange of other types of benefits or rewards or other types of currencies, commodities, or securities. Method 900 includes steps 802, 804, and 806 of the method 800. Additionally, method 900 includes step 902 subsequent to step 802 and prior to step 804, wherein the method continues with issuing, by the computing system, the card issuer points to a corresponding cardholder account of the cardholder before the conversion. Also, method 900 includes step 904 after step 804 and before step 806, wherein the method continues with removing, by the computing system, the card issuer points from the cardholder account before the issuing of the loyalty rewards program points to the loyalty rewards program account. Such steps can also be implemented at least partially through instructions 656 and 658, shown in FIG. 7.

Although, methods 800 and 900 show the conversion and exchange of card issuer points to loyalty rewards program points of one loyalty rewards program entity, such methods can be repeated to include multiple conversions and exchanges from card issuer points to multiple types of loyalty rewards program points of multiple loyalty rewards program entities. For example, in some embodiments, the card issuer points are first card issuer points, the loyalty rewards program points are first loyalty rewards program points, and the predetermined point conversion rule is a first predetermined point conversion rule, and the method further includes additionally converting, by the computing system, second card issuer points of the credit card issuer to second loyalty rewards program points of a second loyalty rewards program entity of the plurality of loyalty rewards program entities according to a second predetermined point conversion rule. Also, the second loyalty rewards program points are issued by the second loyalty rewards program entity to a corresponding second loyalty rewards program account of the cardholder after the additional conversion and automatically according to the second point conversion rule. Furthermore, in some cases, the second card issuer points are issued by the credit card issuer to the cardholder account before the additional conversion, and the issuing of the second loyalty rewards program points to the second loyalty rewards program account follows removing the second card issuer points from the cardholder account.

FIGS. 10 and 11 show methods 1000 and 1100, respectively, implemented by a computing system (such as the computing system 600), for converting and exchanging loyalty points from an account with the card issuer to respective accounts with multiple loyalty rewards programs. For example, method 1000 includes the steps of method 800 and essentially repeats steps 804 and 806 for a second account with a second loyalty point program. Further, at step 1002, the method 1000 includes additionally converting second card issuer points of the credit card issuer to second loyalty rewards program points of a second loyalty rewards program entity of the loyalty rewards program entities according to a second predetermined point conversion rule. And, at step 1004, the method 1000 includes issuing the second loyalty rewards program points to a corresponding second loyalty rewards program account of the cardholder after the additional conversion and automatically according to the second point conversion rule.

Method 1100, shown in FIG. 11, includes the steps of method 900 and essentially repeats steps 804 and 806 as well as steps 902 and 904 for a second account with a second loyalty point program. Further, at step 1102, the method 1100 includes issuing the second card issuer points to the cardholder account before the additional conversion. And at step 1104, the method 1100 includes removing the card issuer points from the cardholder account before the issuing of the loyalty rewards program points to the loyalty rewards program account. Such steps of methods 1000 and 11000 can be implemented at least partially through instructions 656 and 658 shown in FIG. 7.

In some embodiments, the conversions of the first and second card issuer points to the first and second loyalty rewards program points occurs in response to the first and second card issuer points issuing to the cardholder account after respective selected amount of times or on respective selected days of a week, a month, or a billing cycle after the issuance of the issuer points to the cardholder account. In some examples, the respective selected amount of times are each the same amount of time or the respective selected days are each the same day. In some other examples, the respective selected amount of times are each a different amount of time or the respective selected days are each a different day.

FIG. 12 shows a method 1200 implemented by a computing system (such as the computing system 600), for converting and exchanging loyalty points from one account to another as well as providing web portals for interacting with the system and the conversion and exchange mechanisms. As illustrated, method 1200 can be combined with any one or more of the methods disclosed herein. For instance, as shown, method 1200 can include steps of method 800, 900, 1000, or 1100. Although aspects of method 1200 relate to the converting and exchanging loyalty points and user interactions with the system for exchanging loyalty points, it is to be understood that the technologies disclosed by the method 1200 can be applied to other applications and implemented for other purposes such as conversion and exchange of other types of benefits or rewards or other types of currencies, commodities, or securities.

Additionally, at step 1202, the method 1200 continues with storing, by the computing system, the records in a database of the computing system. The stored records are accessible by end users of the computing system according to permissions and user credentials of the end users, and the end users include cardholders and administrators of the credit card issuer, the loyalty rewards program entities, and the computing system. Such steps can be implemented at least partially through instructions 658 to 664 shown in FIG. 7.

At step 1204, the method 1200 includes distributing, by the computing system, an issuer portal over a computer network. The issuer portal is configured to facilitate issuer administrator interactions with the computing system, and the issuer administrator interactions include the issuer administrator selecting loyalty rewards program entities to become linkable with a credit card product issued by the credit card issuer (e.g., see step 1210). At step 1206, the method 1200 includes distributing a loyalty rewards program portal over the network so that end users of a loyalty rewards program entity can interact with the records and the system. At step 1208, the method 1200 includes distributing, by the computing system, a cardholder portal over the computer network. The cardholder portal is configured to facilitate cardholder interactions with the computing system, and the cardholder interactions include the cardholder selecting one of the loyalty rewards program entities to be linked with the credit card of the cardholder (e.g., see step 1214). Such steps can also be implemented at least partially through instructions 658 to 664 shown in FIG. 7.

The method 1200 further includes the issuer administrator selecting loyalty rewards program entities to become optionally linkable with a credit card product issued by the credit card issuer via the portal for the issuer administrator, at step 1210. And, at step 1212, the method 1200 includes the loyalty rewards program administrator accepting the issuer's selection to make it an optionally linkable program with the credit card product via the portal for the loyalty rewards program administrator. Then, at step 1214, the method includes the cardholder selecting one of the loyalty rewards program entities to be linked with the credit card of the cardholder, manually, via the cardholder portal.

At step 1216, the method 1200 continues with linking, by the computing system, program entities according to the selection of the one of the loyalty rewards program entities to be linked with the credit card of the cardholder. At step 1218, the method 1200 continues deriving, by the computing system, computer-readable instructions based on the selection. In some embodiments, as shown, the instructions optionally include a time-based condition, a value-based condition, or a combination thereof for determining a number of points to convert from issuer points to loyalty rewards program points of the selected loyalty rewards program entity. Such steps of method 1200 using the database and portals can be implemented at least partially through instructions 658 to 664 shown in FIG. 7.

FIG. 13 shows a method 1300, implemented by a computing system (such as the computing system 600), for converting and exchanging loyalty points. In some examples, method 1300 can be combined with any one or more of the methods disclosed herein. Although aspects of method 1300 relate to the converting and exchanging loyalty points, it is to be understood that the technologies disclosed by the method 1300 can be applied to other applications and implemented for other purposes such as conversion and exchange of other types of benefits or rewards or other types of currencies, commodities, or securities.

The method 1300 includes, at step 1302, conversion of card issuer points to loyalty rewards program points, such as in step 804 or 1002 of methods 800 and 1000 respectively, by a points exchange engine of the computing system (e.g., see computing system 600 and see instructions 665 which can implement the engine, depicted in FIGS. 6 and 7). Similarly, the conversion can include converting card issuer points of the credit card issuer to loyalty rewards program points of one or more loyalty rewards program entities of the plurality of loyalty rewards program entities according to a predetermined points conversion rule. At step 1302, the conversion of the card issuer points to the loyalty rewards program points includes a two-step conversion including converting the card issuer points to intermediate points and then converting the intermediate points to the loyalty rewards program points. The method 1300, at step 1304 (which is a sub-step of step 1302), includes converting the card issuer points to intermediate points as one step in the two-step conversion. And, the method 1300, at step 1306 (which is a second sub-step of step 1302), includes converting the intermediate points to the loyalty rewards program points. In some embodiments, each conversion of the two-step conversion is a separate atomic transaction. And, at step 1308 of the method, movement of the points from one entity to another entity occurs after the two-step conversion. In some cases, the movement of the points from one entity to the other entity is an atomic transaction separate from other transfers of points. In some examples, the method 1300 also includes initializing, by the engine, two atomic transactions of the two-step conversion separately before moving the points from one entity to the other entity (not depicted).

FIG. 14 shows a method 1400, which is similar to method 1300 and implemented by a computing system (such as the computing system 600), for converting and exchanging loyalty points. In some examples, method 1400 can be combined with any one or more of the methods disclosed herein. Although aspects of method 1400 relate to the converting and exchanging loyalty points, it is to be understood that the technologies disclosed by the method 1400 can be applied to other applications and implemented for other purposes such as conversion and exchange of other types of benefits or rewards or other types of currencies, commodities, or securities. The method 1400 differs from method 1300 in that it illustrates step 1302 and sub-steps 1304 and 1306 from a different perspective relative to one or more ledgers that are a part of or associated with the system.

Within the step 1302, at the conversion of the issuer points to the intermediate points at sub-step 1304, the method 1400 at step 1402 includes debiting an origin point balance of a cardholder of an account with the card issuer. Also, within step 1302 and at step 1304, the method 1400 at step 1404 includes crediting an intermediate point balance of the cardholder of an intermediate account of the cardholder, wherein the intermediate account is hosted by the computing system. Steps 1402 and 1404 define the first atomic transaction of the two atomic transactions of step 1302. The second atomic transaction of the two atomic transactions includes crediting a destination point balance of the cardholder of an account with a loyalty rewards program entity (at step 1406) and then debiting the intermediate point balance of the cardholder associated with the intermediate account of the cardholder (at step 1408). Steps 1406 and 1408 of method 1400 are sub-steps of step 1306 within step 1302, wherein step 1306 includes the conversion of the intermediate points to the loyalty rewards program points.

FIG. 15 illustrates a schematic flowchart for a single point integration 1500 of contracts 1502, financial settlements 1504, and the respective technical integrations 1506 between card issuers, banks, and loyalty rewards program entities, in accordance with some embodiments of the present disclosure. The software-based platform 142 includes a points exchange system based on and according to information derived from the contracts 1502, the financial settlements 1504, and the technical integrations 1506 between card issuers, banks, and loyalty rewards program entities. The exchange system also relies on information entered from cardholders. The exchange system can provide automatic conversion of bank points to chosen partner points (chosen by the cardholders) in order to produce an end result of virtualized co-branding with one or more loyalty rewards program entities. Multi-branding is derived from co-branding with multiple partners (e.g., see partners 114, 114a, and 114b). Dynamic multi-branding includes a bank's ability to choose partners to connect to a credit card, and the cardholder's ability to choose which partner to earn points with.

With respect to contracts 1502, the software-based platform 142 can manage agreements between banks and partners, or between non-bank partners. Instead of having individual contracts between every pair of partners (e.g., see partners 114, 114a, and 114b), businesses can have a single contract executed through the platform 142 such that the contract identifies the point price for that business. There is no need to figure out individual point exchange rates between every two types of points per pair of partners using the platform 142. Rather exchange rates are inferred based on point prices set in the contracts 1502.

With respect to financial settlements 1504, points are documented as liabilities on a company's balance sheet, bank account, or the like. When points are moved from one business to another (e.g., bank to loyalty rewards program partner, or vice versa, in the case of dynamic multi-branding), so is the attached liability. In some embodiments, this includes that the liability must be deleted from the balance sheet of the business that the user is moving points from. In other words, the account with the origin entity has its points debited. In such cases, the liability must subsequently be created on the balance sheet of the business that the user is moving points to. In other words, the account with the destination entity has its points credited. Also, in some embodiments, the origin entity must financially settle with the destination entity. In other words, the origin entity pays the destination the value of the points created on the destination entity's balance sheet. For example, if a cardholder moves $100 worth of points from Bank A to Partner B, then $100 is debited from Bank A's balance sheet, and $100 is credited to Partner B's balance sheet. And, Bank A must pay Partner B $100 according to a settlement process.

As shown in FIG. 15, the software-based platform 142 manages financial settlements between partners connected with the platform (e.g., see partners 114, 114a, and 114b). The bank or loyalty partner can settle its account with the platform 142 periodically or regularly (such as once a month). Such a settlement can cover the balance for each partner and the net balance for all partners. For example, if a bank needs to settle with ten different partners, the bank can settle once with the platform 142, and the platform will disburse the appropriate payments to the ten different partners.

With respect to the technical integrations 1506, the platform 142 can integrate with the information systems of each registered partner (e.g., see partners 114, 114a, and 114b) to integrate point exchanges between banks and loyalty partners or between non-banking entities. In some cases, a core points exchange engine can be integrated with each information system of registered partners (i.e., banks and loyalty rewards program entities registered with the software-based platform 142. Also, in some embodiments, an identity management system of the platform 142 can be integrated with the information systems of the registered partners. The identity management system can provide each user (including cardholders and administrative users of the partners) with a universal identity that spans multiple loyalty rewards program systems. The platform 142 can also integrate automatic points exchange trigger rules with the information systems of the partners to integrate automatic point exchanges and corresponding rules with the information systems of the partners. Also, the platform 142 can integrate a user portal, a partner portal, and a card issuer portal with the information systems of the partners as well as card issuers. For example, the user portal can include an embedded user-interface widget deployed in loyalty platforms and information systems of partners (such as web and mobile apps of partners). Also, a partner portal or card issuer portal can be integrated with information systems and apps of the partners or the card issuers to enable functionality such as self-onboarding and self-service, and setting or changing parameters to enable point exchanges and dynamic multi-branding, such as changing point price. In some embodiments, point price can only be changed on a limited basis, such as once per year.

Such features, as shown in FIG. 15 and described in the corresponding text, can be implemented at least partially through instructions 666 to 670 shown in FIG. 7.

FIG. 16 illustrates a schematic flowchart of operations 1600 of various parts of the software-based platform 142, such as the partner portal 1620 and the cardholder portal 1622, interacting with a points exchange engine 1624 of the platform, in accordance with some embodiments of the present disclosure. The engine 1624 can interact with the portals 1620 and 1622 via an application programming interface (e.g., specifically, a points exchange API). In some embodiments, the points exchange engine 1624 manages and executes moving points and liabilities from one balance sheet to another. The movement of points happens in two steps or two atomic transactions. In the first transaction, the engine 1624 converts origin entity points to platform points. In a second transaction, the points exchange engine 1624 converts platform points to destination entity points. In some examples, since the two transactions are separately atomic, each one is guaranteed to either completely succeed or completely fail. However, in such examples, the combination of the two transactions is not atomic. E.g., the first transaction can pass while the second transaction may fail. Also, as mentioned, in some embodiments, at least some of the APIs are protected with an authentication scheme (including the APIs involved with the points exchange and the aforesaid transactions). In such examples, the caller (whether widget or direct API call) is authenticated initially and acquires an access token before making API calls. In such examples, the access token must be attached to all authenticated API calls.

In some examples, platform points are similar to origin and destination points in the sense that the points have a fixed and manually selected point price. In such examples, given that all types of points have fixed prices, the exchange rates between any two currencies (or point types) can be inferred or generated for use by the engine 1624. The price for platform points is irrelevant and is used by the engine 1624 as an exchange vehicle. For instance, in such examples, Point A, from an origin entity, is priced at $0.20, Point B, for the destination entity, is priced at $0.10, and the point of the software-based platform 142 is priced at $0.40. In this instance, inferred exchange rates include Point A being equivalent to half of a platform point, Point B being equivalent to a quarter of the platform point, and Point B being twice the value of Point A.

As shown in FIG. 16, partners set respective point prices for their respective loyalty rewards programs via the partner portal 1620 (e.g., see setting point prices 1602a, 1602b, and 1602c by partners 114, 114a, and 114b respectively). Once point prices are set and the corresponding partners are approved for selection by the cardholder 112, the cardholder can initiate a points exchange between the accounts of the cardholder with the partners at initiation operation 1604. Partners in this example and others, can include the card issuer, a bank partnered with the issuer, loyalty rewards program partners, etc. The figure also shows the partner portal and cardholder portal interacting with the platform. In some embodiments, the web portals are part of the platform 142. In other examples, the web portals are connected or linked to the platform 142. In some embodiments, the cardholder 112 can choose how many points to convert with the choosing of the partner to receive the points.

Once a points exchange is initiated at operation 1604, points can be debited and credited from the points accounts of the cardholder with multiple partners via the points exchange engine 1624. For example, at operation 1606, the exchange engine 1624 manages the debiting of points from the account of the cardholder 112 with partner 114. Also, included or associated with operation 1606, the platform 142 requests partner 114 to debit the cardholder's point balance the amount of points specified in the initiation operation 1604. At operation 1608, the engine 1624 manages the confirmation of the debiting of the points of partner 114. Also, included or associated with operation 1608, the partner 114 confirms the debit process's success or failure.

At operation 1610, the engine 1624 credits the points to the account of the cardholder with the platform according to the points conversion process of the engine 1624. Next, at operation 1612, the engine 1624 manages the crediting of converted corresponding points of an account of the cardholder 112 with the partner 114b. Also, included or associated with operation 1612, the platform 142 requests partner 114b to credit the point balance of the same cardholder, cardholder 112. At operation 1614, the engine 1624 manages the confirmation of the crediting of the converted points credited to the partner 114b. Also, included or associated with operation 1614, partner 114b confirms the credit process's success or failure. Finally, at operation 1616, the points balance of the platform account is debited accordingly by the platform 142 or more specifically by the engine 1624 in some embodiments.

As mentioned herein with reference to FIG. 15, which shows the integration of information systems through the platform, an identity management system of the software-based platform 142 can be integrated with information systems of the registered partners, including card issuers, banks, and loyalty rewards program entities. The identity management system can provide each user (including cardholders and administrative users of the partners) with a universal identity that spans multiple loyalty rewards program systems. In some cases, the identity management is a component integrated with the points exchange engine 1624 of the platform 142 and aspects of the multi-branding functionality. In some examples of the platform 142, each user that interacts with the exchange engine 1624 has a unique identifier with the platform (including unique identifiers for the cardholders and administrative users of the partners). In the case of cardholders, the identity identifier can be a universal identifier that serves as an aggregator or connector for all loyalty accounts that belong to the user with any partner. In some embodiments, the platform 142 maps the unique platform identifiers and outside partner identifiers. The mapping can be implemented via a database of the platform 142 (e.g., see FIGS. 17 and 18). Also, a unique platform identifier can be mapped to multiple loyalty account identifiers with businesses. From the platform identifier, the platform or the system as a whole is able to identify the user with any other loyalty rewards program.

The mapping through the identifiers includes links that can be generated upon registration with the software-based platform 142. The registration can occur through a mobile app or an online widget or API. A user or cardholder can register through a user interface of the platform directly or via a user interface of a card issuer, bank, or loyalty rewards program entity. Also, business partners that integrate with the platform 142, whether through a mobile app, widget, or API, can provide the platform with the identifier of the user to create the linkage. In some examples, the partner can provide the platform with virtualized identifiers for users, and keep an internal mapping of virtual identifiers to real identifiers that are used by the platform 142. Also, in some embodiments, the identity mapping data can be hosted by the information systems of the partner, and not the platform. In such examples, the partner can identify who the user is with the platform, rather than the opposite functionality.

In some embodiments, the software-based platform 142 provides publicly accessible authentication APIs (sign up, sign in, forgot password, etc.) for creating and managing cardholder user accounts. In some examples, the APIs use representational state transfer (REST) as a software architectural style. Alternatives to using REST can also be used by the platform 142, such as GraphQL, which allows clients to request and receive only the data they require, making it more efficient than REST. Also, gRPC can be used by the platform 142, which provides protocol buffers and a language-agnostic data serialization formatting for possibly more efficient data transfer than REST. MQTT can also be used if the platform 142 remains simpler. Although REST can be used over MQTT as the platform 142 increases in scale. Event-driven architecture (EDA) can also replace REST or be used with it by the platform 142, especially for implementing communications related to the automatic exchange triggers described herein. EDA can improve real-time data processing and can reduce the need for repeated polling of resources, which can be resource-intensive and time-consuming if REST is used alone. The aforementioned example alternatives to using REST are just some of the many alternatives that could be used by the platform 142 as a software architecture.

In some examples, cardholder users can register for use of the platform once, such as through any partner loyalty information system. The same universal platform identifier for the user can be used to identify a user within the platform user logging in from any loyalty platform with adequate integration such as the integration shown in FIG. 15 between the partners and the platform.

Figures 17, 18:
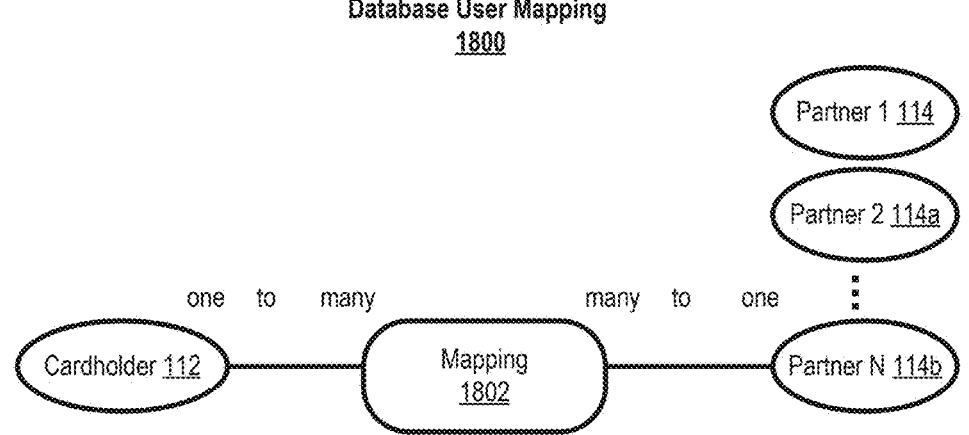
FIG. 17 illustrates a database table for the identity management feature of the platform, in accordance with some embodiments of the present disclosure.
FIG. 18 illustrates a schematic flowchart of user database mapping for the identity management feature of the platform, in accordance with some embodiments of the present disclosure.

In some examples of the platform, upon signing in from a certain partner platform, a record is created in an identity management part of the database of the platform to reflect the linkage between the universal platform identifier and the user identifier with that partner. For instance, FIG. 17 illustrates an example database table 1700 for the identity management feature of the platform. As shown in FIG. 17, the Universal User 1 has a user ID of 777 with Partner A and a user ID of 888 with Partner B. While Universal User 2 has a user ID of 999 with Partner B. In such examples, this means that User 1 has signed into the software-based platform 142 through both Partner A and Partner B, for the linkage to be created. While User 2 signed into the Platform through Partner B only, therefore the only linkage created was with the identifier with Partner B. The data in the table provided in FIG. 17 as well as other configurations of the data can be provided through a many-to-many relationship in the database, between user IDs representing platform users and partner IDS representing partners. FIG. 18 illustrates a schematic flowchart of an example of user database mapping for the identity management feature of the platform 142. As shown, the mapping 1800 uses database table mapping 1802 or the like to map many cardholder users to many partners. This can be implemented by having a user, such as the cardholder 112, linked through the database table mapping 1802 in a one-to-many relationship with a platform ID for the user, as shown in the figure. And, for each partner (e.g., see partners 114, 114a, and 114b), the database table mapping 1802 can link many cardholder user IDS to one partner in a many-to-one relationship; and thus, a many-to-many mapping functionality is provided via the mapping 1800 and the database table mapping 1802.

As mentioned herein with reference to FIG. 15, the software-based platform 142 can also integrate automatic points exchange trigger rules with information systems of the partners to integrate automatic point exchanges and corresponding rules with the information systems of the partners. In some embodiments, the automatic points trigger rules are a necessary part of enabling dynamic multi-branding. In such embodiments, the trigger rules can be implemented via the exchange engine 1624. Also, for the rules, every partner can set its price for its points (such as via a partner portal to the platform 142). Also, manual exchanges, using the rules, can be triggered by cardholder users whenever they want to convert their points from one partner to another.

Cardholder users can set automatic rules to trigger point exchanges, such as via the cardholder portal (e.g., see portal 1622), as soon as points land in their account for one reason or another. In the case of dynamic multi-branding, users can configure their accounts to automatically convert their earned bank points to partner points. And, users can have different rules for different partners. Users can also set multiple rules for the same partner. Rules can be time, value, or percentage based, for example. From the cardholder's perspective, they are earning partner points (airlines, hotels, etc.) when spending on their bank card. However, under the hood, they are earning proprietary bank points, which are subsequently converted to partner points based on the trigger rules configuration.

The trigger rules can be stored through one or more tables or records in a database, such as a database of the software-based platform 142. Upon a spend transaction detection, the bank can check for the trigger rules configured for the cardholder's spending. In some embodiments, the bank or card issuer can generate or determine its records for such rules and store such rules in its information system. Also, in some examples, the loyalty rewards program entities can generate or determine their records for such rules in their information systems. In the case of a remote deployment of the trigger rules, a partner can initiate a network communication, such as an API call, with the platform 142 to generate or determine the trigger rules for them for automatic exchanges. In some embodiments, the rules are a layer on top of the points exchange engine 1624.

In some embodiments, the trigger rules are recorded and managed through a database management system (DBMS). FIGS. 19 to 21 illustrate example database tables for the automatic exchange trigger rules feature of the software-based platform 142 that can be managed or used by a DBMS, in accordance with some embodiments of the present disclosure. FIG. 19 illustrates a table 1900 having data that can be associated with a percentage-based trigger rule. As shown, the data in the table 1900 includes User 1 using a configured trigger to automatically convert 50% of their earned bank points to points with Partner 123 and the other 50% to points with Partner 456. Whereas User 2 opted to automatically convert 100% of their earned bank points to points with Partner 123. FIG. 20 illustrates a table 2000 having data that can be associated with a time-based trigger rule. As shown, the data in the table 2000 includes User 1 using a configured trigger to automatically convert 100% of their earned bank points to points with Partner 123 if the date is in January of 2024 or later, and convert 100% of the bank points to points with Partner 456 if the date is in June of 2024 or later. Whereas User 2 opted to automatically convert 100% of their earned bank points to points with Partner 123 if the date is in February 2024 or later. FIG. 21 illustrates a table 2100 having data that can be associated with a value-based trigger rule. As shown, the data in the table 2100 includes User 1 using a configured trigger to automatically convert 100% of a cardholder user's earned bank points to points with Partner 123 if the value of the points earned is worth $50 or more, and convert 100% of the bank points to points with Partner 456 if the value of the points earned is $100 or more. User 2 opted to automatically convert 100% of their earned bank points to points with Partner 123 if the value of the points earned is $75 or more.

Figure 22:
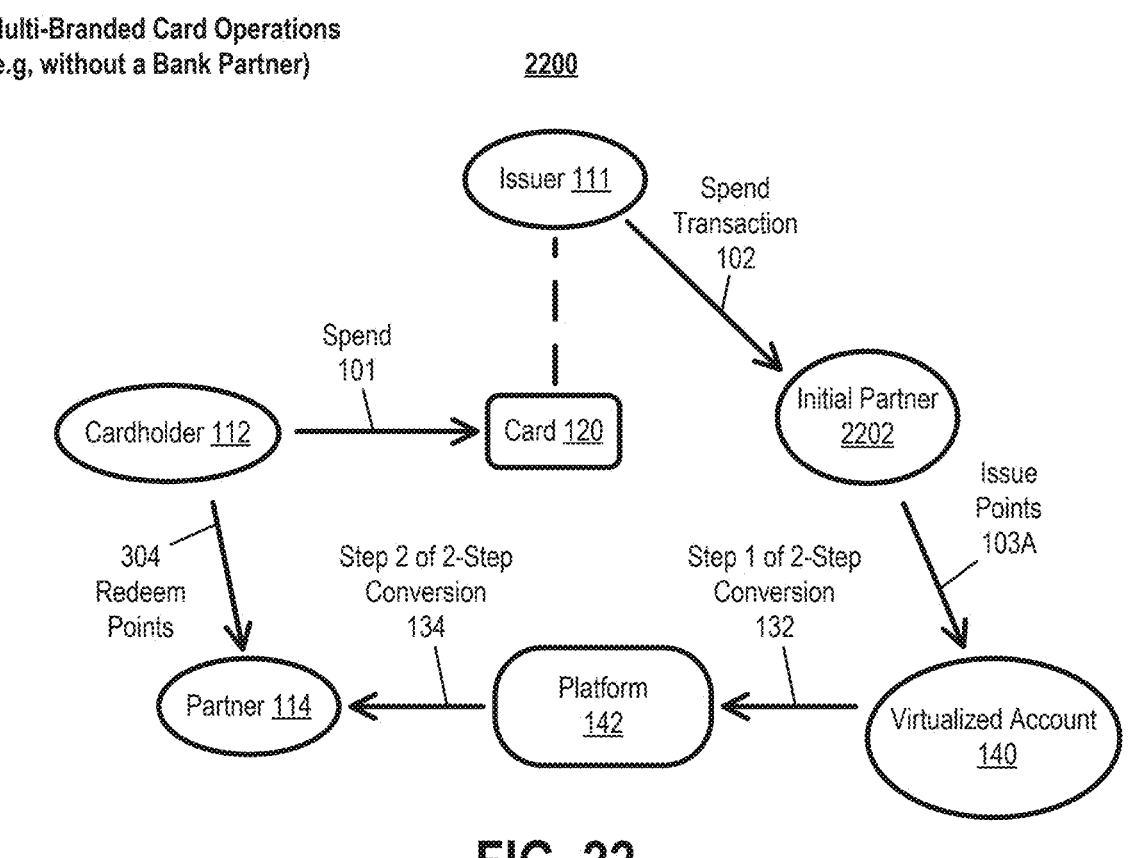
FIG. 22 illustrates a schematic flowchart for alternative multi-branded card operations, where an initial partner (which can be a card issuer, bank, or another type of company or loyalty rewards program partner or a first loyalty rewards program of multiple different loyalty rewards programs within one organization) connects with one or more other companies or loyalty rewards programs, in accordance with some embodiments of the present disclosure, and which provide another example technical solution for overcoming the static nature of co-branded card operations.

FIG. 22 illustrates a schematic flowchart for alternative multi-branded card operations 2200, where an initial partner 2202 (which can be a card issuer, bank, or another type of company or loyalty rewards program partner or a first loyalty rewards program of multiple different loyalty rewards programs within one organization) connects with one or more other companies or loyalty rewards programs (e.g., see partner 114), in accordance with some embodiments of the present disclosure, and which provide another example technical solution for overcoming the static nature of co-branded card operations 100. With operations 2200, a two-step process occurs to simulate co-branding and multi-branding experiences (e.g., see conversion operations 132 and 134). In some embodiments, the simulation of co-branding and multi-branding experiences can occur via a different linking and multi-branding process (although such alternatives are not depicted in FIGS. 22 to 24). In some embodiments, as shown in FIG. 22, the two-step process (which includes the conversion operations 132 and 134) becomes an additional process to the typical operations of co-branded card operations 100 to change the operations to multi-branded card operations 2200.

Similarly, as shown in FIG. 22 as well as FIGS. 1 and 2, the operations associated with a co-branded card or a multi-branded card include the card issuer 111 issuing the credit card 120 to the cardholder 112. The cardholder can then spend money by using the card, at spend operation 101. The spend transaction is then received and recorded for the account of the cardholder 112 with the initial partner 2202. The spend transaction communication 102 is sent to the initial partner 2202 from the card issuer 111. In some examples, the card issuer 111 and the initial partner 2202 are the same company or organization. The spend transaction communication 102 can be bypassed in some embodiments of the multi-branded card operations 2200 (although this is not shown in FIG. 22). The reason the communication 102 can be bypassed is that a software-based platform 142 can manage such functionality or replace such functionality with a completely different operation. Also, the initial partner 2202 requests to issue points to an account of the cardholder 112 with the loyalty partner 114, which can be considered a second loyalty rewards program partner (wherein the initial partner is a first loyalty rewards program partner).

Also, similarly, the points issuance request 103A is received and recorded in a virtual account for the partner 114. The virtualized account 140, in the operations 2200, is hosted by the initial partner 2202 or through the software-based platform 142, only, depending on the embodiment. Also, through co-branded card operations 100 or multi-branded card operations 2200, once the virtualized account 140 is debited and the second partner account is credited for the cardholder 112, the cardholder can redeem the points via a redemption operation 104. In some embodiments of the operations 2200, the points of the account with the initial partner 2202 are converted to second partner points based on an exchange rate.

In some embodiments, a difference between the co-branded card operations 100 and multi-branded card operations 130 is the conversion from a first type of partner points to a second type of partner points instead of directly issuing partner points of a certain partner (e.g., see the account 140 that keeps track of the points of the initial partner 2202, and see the conversion operations 132 and 134). The conversion from first partner points to second partner points, performed by the software-based platform 142 and the conversion operations 132 and 134, as shown in FIG. 22, provides for dynamic multi-branding as a feature for any card point system. Thus, banks or credit card issuers, or any initiator of a vehicle for earning loyalty rewards, can select which partners to enable for their cardholders or customers in a broader sense. And, cardholders or customers can choose which partner from an available list of partners to earn points or another type of reward with when spending money via a credit card (such as credit card 120).

In some embodiments, a first loyalty partner or program and a second loyalty partner or program sign up on the software-based platform 142. Such partners or programs can then make themselves available for co-branding or multi-branding via the platform 142, such as via a web portal for loyalty rewards program partners or programs. The bank or a card issuer, or another type of initial partner or program, can then add a card, or another type of rewards-earning vehicle, for multi-branding via the platform. Also, the initial partner or issuer can choose the loyalty partner from a list of available partners to become another partner for its multi-branded card. These functions can occur or be initiated via a web portal for the initial partner 2202. In such cases, the loyalty partner receives and can accept the offer using the platform 142, such as via the portal for loyalty rewards program partners. After such steps, by the initial partner, issuer, and the other loyalty rewards program partner, the cardholder for the card can choose the loyalty partner to earn points via the platform 142. As suggested or mentioned herein, the aforementioned steps of FIG. 22 can be applicable to any type of loyalty rewards program of the same organization or different organizations. And, the card can be any type of vehicle for a customer or end user to earn points or rewards of any type besides points when performing certain activities such as spending money via the vehicle.

In some examples, the cardholder can interact and make such a choice via a web portal for cardholders. Finally, the user uses the card and earns points with the loyalty partner. This can be done for multiple loyalty partners if the cardholder chooses to link the card with multiple loyalty partners. This multi-linking functionality is not possible via the co-branded card operations 100 and can only be done through the multi-branded card operations 130 or some derivative of the operations 130—such as an alternative set of operations that still use the software-based platform 142 or the conversion operations 132 and 134 of the two-step conversion mentioned herein.

Figure 23:
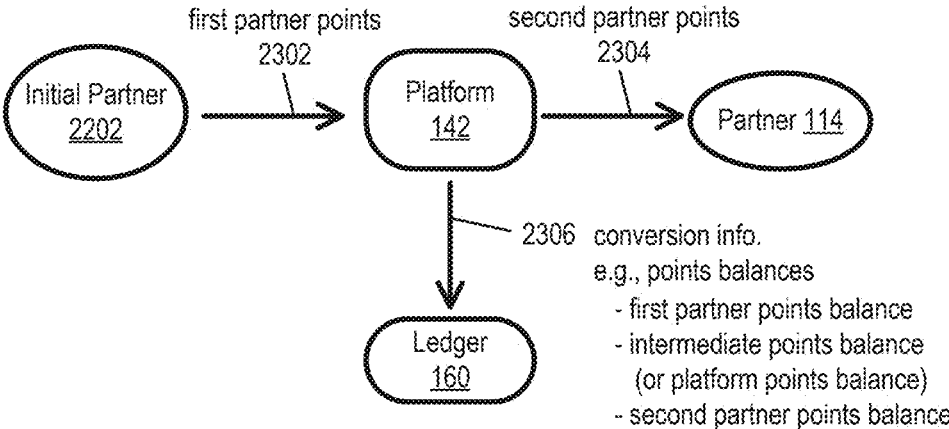
FIG. 23 illustrates a schematic flowchart for another example points exchange of multi-branded cards, where an initial partner (which can be a card issuer, bank, or another type of company or loyalty rewards program partner or a first loyalty rewards program of multiple different loyalty rewards programs within one organization) connects with one or more other companies or loyalty rewards programs, in accordance with some embodiments of the present disclosure.

FIG. 23 illustrates a schematic flowchart for another example points exchange 2300 of multi-branded cards, where an initial partner (which can be a card issuer, bank, or another type of company or loyalty rewards program partner or a first loyalty rewards program of multiple different loyalty rewards programs within one organization) connects with one or more other companies or loyalty rewards program, in accordance with some embodiments of the present disclosure. The points exchange 2300 can include, be a part of, or be associated with the multi-branded card operations 2200 or some derivative of the operations 2200. Also, the points exchange 2300 can include, be a part of, or be associated with use of the software-based platform 142 or the conversion operations 132 and 134 of the two-step conversion mentioned herein. The operations 2200 can be triggered manually or automatically via a computing system, and this can be the case when it is used with the multi-branded card operations 2200. In some embodiments, each card issuer, institution, bank, or other organization, that signs up on the platform 142, must specify a price for their point after sign up and before going live. In some example systems, the price of a point for a party is universal and is used to determine the exchange rate with every other partner point. For example, in the context of multi-branding, A first partner or loyalty rewards program prices its point at $0.2, a second partner or loyalty rewards program prices its point at $0.1, and when the cardholder spends money with the corresponding credit card, the cardholder earns 10 bank points. Next, the 10 first partner points of the first partner or program are converted to 20 second partner points of the second partner or program. This conversion can occur always if the cardholder configured the conversion to include earning 100% of their points with the second partner or program. In some embodiments, such a conversion is automated after the configuration is set by the cardholder. In some examples, there can be an additional step added where the conversion requires approval from the cardholder—such as an approval step via a cardholder portal.

In general, as shown in FIG. 23, the initial partner 2202 or its computing system interacts with the software-based platform 142 such that the first partner points 2302 are converted to second partner points 2304 via the platform. The partner 114, or another second partner, also interacts with platform 142 such that the initial partner or its computing system is notified and optionally records the conversion. The initial partner 2202 or its computing system can also record the conversion. As shown, the platform 142 records and tracts the conversion via a ledger 160 managed and hosted by the platform. The ledger 160 includes conversion information 2306 which includes information from and related to the conversion. The conversion information 2306 can include, specifically, points balances of accounts of the parties involved such as the cardholder's balances in accounts with a card issuer (e.g., see the issuer 111), a bank, or another type of rewards or loyalty rewards program partner (e.g., see initial partner 2202), another loyalty rewards program partner (e.g., see the partner 114), or the platform 142. As suggested or mentioned herein, the aforementioned steps of FIG. 23 can be applicable to any type of loyalty rewards program of the same organization or different organizations. And, the card can be any type of vehicle for a customer or end user to earn points or rewards of any type besides points when performing certain activities such as spending money via the vehicle.

Figure 24:
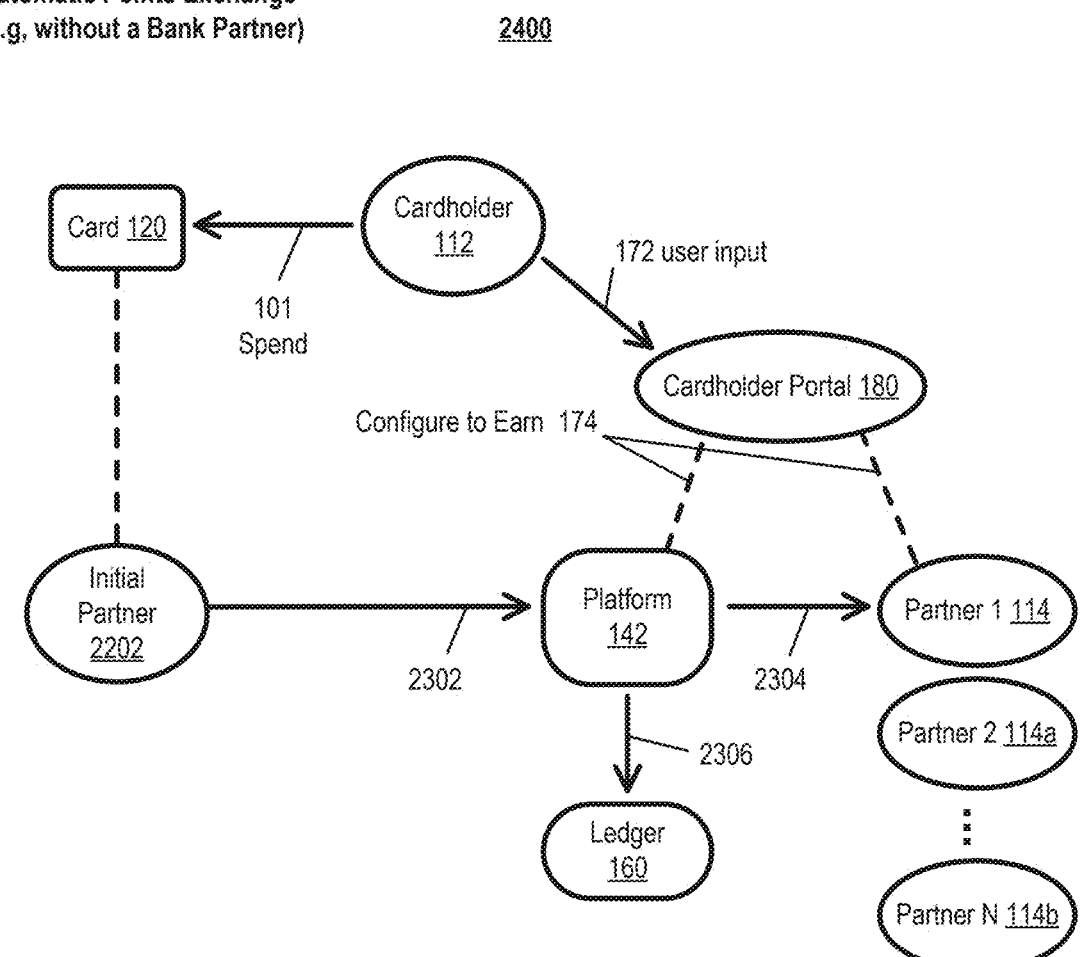
FIG. 24 illustrates a schematic flowchart for another example automatic points exchange of multi-branded cards, where an initial partner (which can be a card issuer, bank, or another type of company or loyalty rewards program partner or a first loyalty rewards program of multiple different loyalty rewards programs within one organization) connects with one or more other companies or loyalty rewards programs, in accordance with some embodiments of the present disclosure.

FIG. 24 illustrates a schematic flowchart for another example automatic points exchange 2400 of multi-branded cards, where an initial partner (which can be a card issuer, bank, or another type of company or loyalty rewards program partner or a first loyalty rewards program of multiple different loyalty rewards programs within one organization) connects with one or more other companies or loyalty rewards programs, in accordance with some embodiments of the present disclosure. In general, as shown in FIG. 24, the initial partner 2202 or its computing system interacts with the software-based platform 142 such that the first partner points 2302 are converted to second partner points 2304 via the platform. Loyalty rewards program entities or partners (such as partners 114, 114a, and 114b) also interact with platform 142 such that the partners or their respective computing systems are notified and optionally record the conversions. The initial partner 2202 or its computing system can also record the conversion in the automatic points exchange 2400. As shown, the platform 142 records and tracts the conversion via the ledger 160 managed and hosted by the platform with the automatic points exchange 2400, and similarly the ledger 160 for the automatic points exchange 2400 includes the conversion information 2306.

Also shown in FIG. 24, the cardholder 112 can spend money by using the card 120, at spend operation 101, and the points earned from such spending can be provided directly or via the software-based platform 142 from loyalty rewards program entities (e.g., see partners 114, 114a, and 114b). The spend transaction is received and recorded for the account of the cardholder 112 with the initial partner 2202 too. Also, the initial partner 2202 requests to issue points to an account of the cardholder 112 with one or more of the loyalty partners depending on user input 172 into the cardholder portal 180. The user input 172 is used by the platform to configure the way in which cardholders earn points from the one or more loyalty partners. The configured-to-earn function 174 links the corresponding operations of the platform with the one or more partners to instruct the cardholder's earning of points from the one or more loyalty partners. As mentioned, cardholder users have the choice to select which partner to be earning points with upon spending on the multi-branded card, using the user portal. Also, the user can select one or more destinations for their points and configure rules to control the flow of points. In some examples, cardholder users are free to select partners from the list of businesses that the initial partner 2202 has added to its card coalition. Users can change their selection choice. The rules that users configure can be time, value, or percentage based, and such selections can be managed via a database of the software-based platform 142 (e.g., see database tables of platform 142 shown in FIGS. 19 to 21). Also, as suggested or mentioned herein, the aforementioned steps of FIG. 24 can be applicable to any type of loyalty rewards program of the same organization or different organizations. And, the card can be any type of vehicle for a customer or end user to earn points or rewards of any type besides points when performing certain activities such as spending money via the vehicle.

In general, regarding the points exchange engine 1624 and the computing system running the engine, the computing system can generate records that include relationship information linking a credit card of a credit card issuer to loyalty rewards program entities. The engine 1624 can then convert card issuer points of the credit card issuer to loyalty rewards program points of one of the loyalty rewards program entities according to a point conversion rule, wherein the card issuer points are issued by the credit card issuer to a cardholder of the credit card. In some cases, the conversion of the card issuer points to the loyalty rewards program points includes a two-step conversion including converting origin entity points to intermediate points and the converting the intermediate points to destination points. And, in some examples, the origin entity points include the card issuer points, the intermediate points include platform points of a multi-branding platform (e.g., see platform 142), and the destination points include loyalty rewards program points. Each one of the card issuer points can have a first set price, wherein each one of the platform points has a second set price, and wherein each one of the loyalty rewards program points has a third set price. The second set price of the platform points can be solely dependent on the first and third set prices of the issuer and program points. The set prices can be fixed prices. In some cases, the fixed prices are adjusted only per an agreed-upon schedule between the issuer and a loyalty rewards program entity. Or, the set prices are dynamic and adjust according to dynamic point pricing rules.

In some embodiments, each conversion of the two-step conversion is a separate atomic transaction. Also, movement of points from one entity to another entity can occur after the two-step conversion. The movement of points from one entity to the other entity can be an atomic transaction separate from other movements of points. Also, the engine 1624 can initialize two atomic transactions separately before moving the points from one entity to the other entity. A first atomic transaction of the two atomic transactions can include debiting an origin point balance of the cardholder associated with an account with the card issuer as well as crediting an intermediate point balance of the cardholder associated with an intermediate account of the cardholder. The intermediate account can be hosted by a multi-branding platform (e.g., see platform 142). A second atomic transaction of the two atomic transactions can include crediting a destination point balance of the cardholder associated with an account with a loyalty rewards program entity as well as debiting the intermediate point balance of the cardholder associated with the intermediate account of the cardholder.

With the operation of the engine 1624, atomic crediting and debiting of the balance of the account of the cardholder with the loyalty rewards program entity can be executed according to a software-based online control module (such as an online control module implemented via webhooks or the like). The online control module can be configured via a portal website of the loyalty rewards program entity. In some examples, the portal website of the loyalty rewards program entity is at least partially derived from features of a multi-branding platform (e.g., see platform 142). Also, in some examples, the online control module and its components are at least partially derived from features of the multi-branding platform. The features of the platform can adhere to an online communications and application architecture that is standardized but customizable (such as REST or an alternative to REST). Also, parts of the portal website, including the online control module, can adhere to an online communications and application architecture that is standardized but customizable. The online control module can be configured via a widget that is hosted by the portal website and provided by the multi-branding platform. The widget can adhere to an online communications and application architecture that is standardized but customizable. In some embodiments, the platform provides an API for customization of the widget.

In some embodiments, the software-based platform 142 provides a set of APIs to facilitate point and liability movement. The APIs can be RESTful or leverage another type of software architecture style more in line with the scale of the platform 142 for different implementations of the platform. The APIs and other aspects of the platform can be on servers, such as servers of a cloud computing environment. E.g., see FIG. 5, showing the computer network 500 that can various client- and server-side aspects of the platform 142. The APIs used by the platform support complete and end-to-end functionality for converting points between partners, and can be complemented with a plug-and-play widget that is embedded in partner platforms to provide a user-facing interface for variations on the exchange engine described herein (e.g., see the engine 1624 shown in FIG. 16). With such widgets, or the various portals described herein, partners can build their user interface to interface with the exchange engine. The widget significantly minimizes the level of effort required to get to production, as it provides all necessary functionality out of the box. The widget can be styled and branded to look and feel like the platform where it is embedded. In some examples, the widget can be distributed as a service or a white-label solution to be hosted on the partner's servers.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like. It should be borne in mind, however, that these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMS, magnetic or optical cards, or any type of media suitable for storing electronic instructions, each coupled to a computer system bus.

The algorithms and functionality presented herein are not inherently related to any particular computer or other apparatus. Various general-purpose systems can be used with programs in accordance with the teachings herein, or it can prove convenient to construct a more specialized apparatus to perform the methods disclosed herein. The structure for a variety of these systems will appear as set forth herein. In addition, the present disclosure is not described with reference to any particular programming language. It will be appreciated that a variety of programming languages can be used to implement the teachings of the disclosure as disclosed herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:

distributing a user web portal over the Internet by a first computing system of a platform configured to improve exchanging loyalty rewards and customer engagement with such exchanges;

providing, by the first computing system, a group of application programming interface (API) endpoints for authentications, authorizations, and points exchanges to at least standardize relationships in the platform and linking between credit card issuers and loyalty rewards program entities;

distributing, by the first computing system, a card issuer web portal over the Internet configured to provide an interface for an administrator of a credit card issuer to link the credit card issuer with a plurality of loyalty rewards program entities using at least one of the API endpoints;

generating, by the first computing system, records that comprise relationship information linking a credit card of the credit card issuer to the plurality of loyalty rewards program entities according to a selection by a cardholder of the credit card through the user web portal and links between the credit card issuer and the plurality of loyalty rewards program entities created through the card issuer web portal;

converting, by the first computing system, card issuer points of the credit card issuer to loyalty rewards program points of one loyalty rewards program entity of the plurality of loyalty rewards program entities according to a point conversion rule that is at least partially based on the selection by the cardholder, wherein the selection includes selecting, through the user web portal, the plurality of loyalty rewards program entities and configuring, through the user web portal, percentage-based rules of the point conversion rule to control a flow of points, and wherein the selection sets different percentage-based rules for different entities of the plurality of loyalty rewards program entities such that the cardholder earns different percentages of points from different loyalty rewards program entities automatically after using the credit card according to the point conversion rule; and issuing, by a second computing system connected to the first computing system over the Internet, the loyalty rewards program points by the one loyalty rewards program entity to a corresponding loyalty rewards program account of the cardholder of the credit card after the conversion and automatically according to the point conversion rule.

2. The method of claim 1, wherein the card issuer points are issued by the credit card issuer to a corresponding cardholder account of the cardholder before the conversion, and wherein the issuing of the loyalty rewards program points to the loyalty rewards program account follows removing the card issuer points from the cardholder account.

3. The method of claim 2, wherein the card issuer points are first card issuer points, the loyalty rewards program points are first loyalty rewards program points, and the point conversion rule is a first predetermined point conversion rule, wherein the method further comprises additionally converting, by the first computing system, second card issuer points of the credit card issuer to second loyalty rewards program points of a second loyalty rewards program entity of the plurality of loyalty rewards program entities according to a second predetermined point conversion rule, and wherein the second loyalty rewards program points are issued by the second loyalty rewards program entity to a corresponding second loyalty rewards program account of the cardholder after the additional conversion and automatically according to the second point conversion rule.

4. The method of claim 3, wherein the second card issuer points are issued by the credit card issuer to the cardholder account before the additional conversion, and wherein the issuing of the second loyalty rewards program points to the second loyalty rewards program account follows removing the second card issuer points from the cardholder account.

5. The method of claim 4, wherein the conversions of the first and second card issuer points to the first and second loyalty rewards program points occurs in response to the first and second card issuer points issuing to the cardholder account after respective selected amount of times or on respective selected days of a week, a month, or a billing cycle after the issuance of the issuer points to the cardholder account.

6. The method of claim 1, further comprising storing, by the first computing system, the records in a database, wherein the stored records are accessible by end users of the first computing system according to permissions and user credentials of the end users, and wherein the end users comprise cardholders and administrators of the credit card issuer, the loyalty rewards program entities, and the first computing system.

7. The method of claim 1, wherein the card issuer web portal is configured to facilitate issuer administrator interactions with the first computing system, and wherein the issuer administrator interactions include the issuer administrator selecting loyalty rewards program entities to become linkable with a credit card product issued by the credit card issuer.

8. The method of claim 7, wherein the user web portal configured to facilitate cardholder interactions with the first computing system, and wherein the cardholder interactions include the cardholder selecting one of the loyalty rewards program entities to be linked with the credit card of the cardholder.

9. The method of claim 8, further comprising linking program entities according to the selection of the one of the loyalty rewards program entities to be linked with the credit card of the cardholder, wherein corresponding computer-readable instructions are derived by the first computing system based on the selection, and wherein the selection is made manually by the cardholder via the user web portal.

10. The method of claim 9, wherein the computer-readable instructions comprises a time-based condition, a value-based condition, or a combination thereof for determining a number of points to convert from issuer points to loyalty rewards program points of the selected loyalty rewards program entity.

11. The method of claim 1, wherein the point conversion rule comprises an exchange rate.

12. The method of claim 11, wherein the point conversion rule comprises an issuer's price for a point issued by the credit card issuer and a loyalty rewards program entity's price for a point issued by the loyalty rewards program entity, and wherein the issuer's and loyalty rewards program entity's prices are a basis for determining the exchange rate.

13. The method of claim 1, wherein conversion of the card issuer points to the loyalty rewards program points is performed by a points exchange engine of the platform and comprises a two-step conversion comprising converting the card issuer points to intermediate points and then converting the intermediate points to the loyalty rewards program points.

14. The method of claim 13, wherein each conversion of the two-step conversion is a separate atomic transaction, wherein movement of the points from one entity to another entity occurs after the two-step conversion, and wherein the movement of the points from one entity to the other entity is an atomic transaction separate from other transfers of points.

15. The method of claim 14, further comprising initializing, by the engine, two atomic transactions of the two-step conversion separately before moving the points from one entity to the other entity.

16. The method of claim 15, wherein a first atomic transaction of the two atomic transactions comprises:

debiting an origin point balance of the cardholder of an account with the card issuer;

crediting an intermediate point balance of the cardholder of an intermediate account of the cardholder, wherein the intermediate account is hosted by the first computing system, and wherein a second atomic transaction of the two atomic transactions comprises:

crediting a destination point balance of the cardholder of an account with a loyalty rewards program entity; and debiting the intermediate point balance of the cardholder associated with the intermediate account of the cardholder.

17. The method of claim 16, wherein the engine can interact with the user web portal and the card issuer web portal via an API and the API is protected with an authentication scheme.

18. The method of claim 17, further comprising the first computing system authenticating the user web portal initially and acquiring an access token before making API calls for the conversion, wherein each API call must include the token for the call to be authenticated.

19. The method of claim 18, further comprising the first computing system authenticating the card issuer web portal initially and acquiring an access token before making API calls for linking the credit card issuer with the plurality of loyalty rewards program entities.

20. The method of claim 16, wherein the engine comprises an online control module that uses webhooks to at least partially execute the two atomic transactions.

* * * * *